(12) United States Patent
Rebsdorf et al.

(10) Patent No.: US 10,971,989 B2
(45) Date of Patent: Apr. 6, 2021

(54) WIND TURBINE WITH A SUPERCONDUCTIVE GENERATOR HAVING AN IMPROVED THERMALLY INSULATING STRUCTURE

(71) Applicant: Envision Energy (Denmark) ApS, Silkeborg (DK)

(72) Inventors: Anders Varming Rebsdorf, Skanderborg (DK); Mogens Christensen, Tjele (DK); Stephane A. Eisen, Louisville, KY (US)

(73) Assignee: Envision Energy (Denmark) ApS, Silkeborg (DK)

( * ) Notice: Subject to any disclaimer, the term of this patent is extended or adjusted under 35 U.S.C. 154(b) by 268 days.

(21) Appl. No.: 16/064,565

(22) PCT Filed: Nov. 22, 2016

(86) PCT No.: PCT/DK2016/050383
§ 371 (c)(1),
(2) Date: Jun. 21, 2018

(87) PCT Pub. No.: WO2017/108042
PCT Pub. Date: Jun. 29, 2017

(65) Prior Publication Data
US 2018/0375419 A1    Dec. 27, 2018

(30) Foreign Application Priority Data

Dec. 21, 2015 (DK) .................................. 2015 70843
Apr. 26, 2016 (DK) .................................. 2016 70257

(51) Int. Cl.
*H02K 55/04* (2006.01)
*H02K 7/18* (2006.01)
(Continued)

(52) U.S. Cl.
CPC ............... *H02K 55/04* (2013.01); *H02K 1/30* (2013.01); *H02K 7/1838* (2013.01); *F03D 9/25* (2016.05);
(Continued)

(58) Field of Classification Search
CPC ............ H02K 1/28; H02K 1/30; H02K 55/04; H02K 7/1838; H02K 7/2706; H02K 7/24;
(Continued)

(56) References Cited

U.S. PATENT DOCUMENTS 6,597,082 B1    7/2003 Howard
8,692,433 B2    4/2014 Eugene
(Continued)

FOREIGN PATENT DOCUMENTS

CN    103151875 A    6/2013
EP    0805545 A1    11/1997
(Continued)

*Primary Examiner* — Quyen P Leung
*Assistant Examiner* — Alexander A Singh
(74) *Attorney, Agent, or Firm* — James Creighton Wray

(57) ABSTRACT

The invention relates to a wind turbine with a generator and a method of assembling a generator thereof, wherein the generator comprises a rotor rotatably arranged relative to a stator. The rotor comprises a plurality of superconducting pole units arranged on a back iron which is spaced apart from a rotor structure by a number of thermally insulating plates or beams. Said plates or beams are located between either ends of the rotor and orientated relative to the rotational direction of the rotor. Each plate has a first end firmly connected to another first beam extending in an axial direction and a second end firmly connected to another second beam also extending the axial direction. The first beams are further firmly connected to the back iron while the second beams are further firmly connected to the rotor structure. The thermally insulating plates or beams provide a flexible (Continued)

and cheap support interface that is able to adapt to the tolerances of the individual components.

26 Claims, 14 Drawing Sheets

(51) Int. Cl.
 *H02K 1/30* (2006.01)
 *F16L 59/02* (2006.01)
 *F03D 9/25* (2016.01)

(52) U.S. Cl.
 CPC ......... *F05B 2220/706* (2013.01); *F16L 59/02* (2013.01); *Y02E 10/72* (2013.01); *Y02E 40/60* (2013.01)

(58) Field of Classification Search
 CPC . H02K 7/26; H02K 7/265; H02K 7/22; F03D 9/25; F16L 59/02; F05B 2220/706; Y02E 10/72; Y02E 40/60
 See application file for complete search history.

(56) References Cited

U.S. PATENT DOCUMENTS

| | | | |
|---|---|---|---|
| 2006/0284507 A1* | 12/2006 | Murakami | H02K 1/2793 |
| | | | 310/156.37 |
| 2008/0079323 A1 | 4/2008 | Zhang | |
| 2010/0096942 A1* | 4/2010 | Eugene | H02K 1/32 |
| | | | 310/194 |
| 2012/0126541 A1* | 5/2012 | Meller | H02K 1/14 |
| | | | 290/55 |
| 2012/0306212 A1* | 12/2012 | Sarmiento Munoz | F03D 80/60 |
| | | | 290/55 |
| 2013/0181552 A1 | 7/2013 | Frank | |
| 2014/0009014 A1 | 1/2014 | Scuotto | |
| 2014/0084590 A1* | 3/2014 | Rhinefrank | H02K 1/2753 |
| | | | 290/53 |
| 2015/0162799 A1* | 6/2015 | Ilan | F16F 15/03 |
| | | | 310/74 |

FOREIGN PATENT DOCUMENTS

| | | |
|---|---|---|
| EP | 2521252 A1 | 11/2012 |
| WO | 9802953 A1 | 1/1998 |
| WO | 2015084790 A1 | 6/2015 |

* cited by examiner

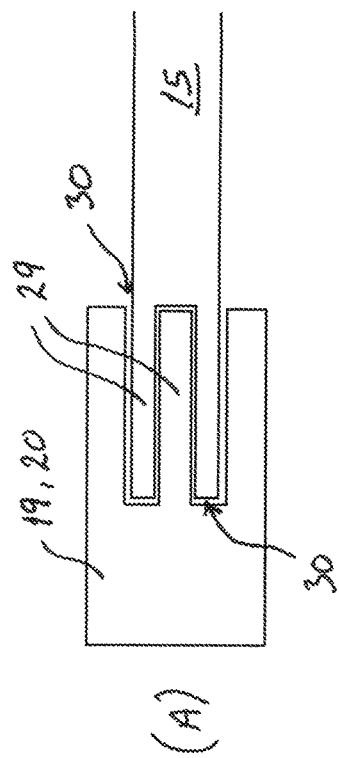
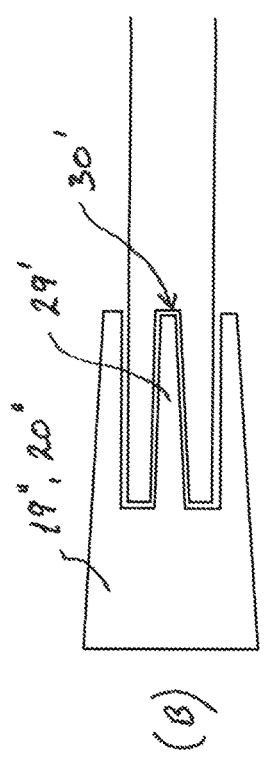
Fig. 11
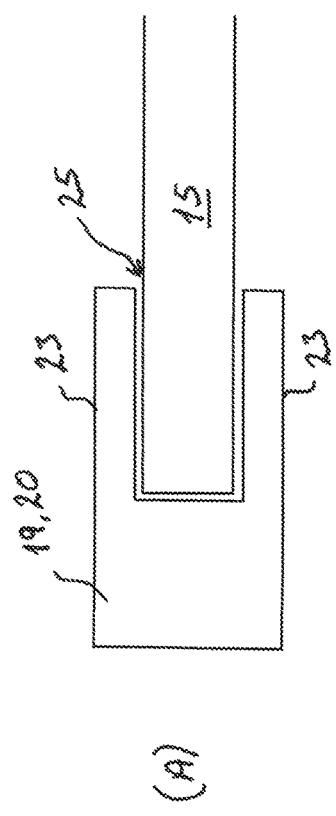
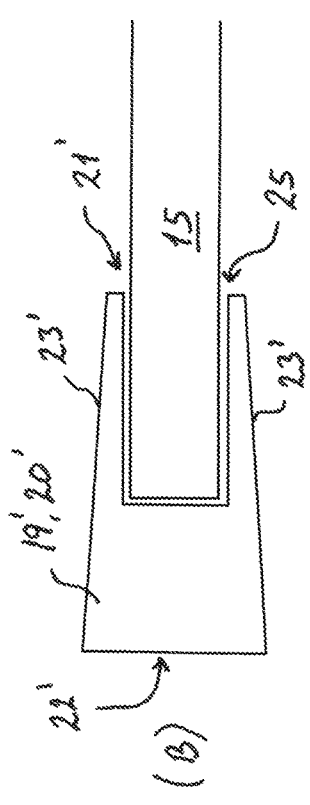
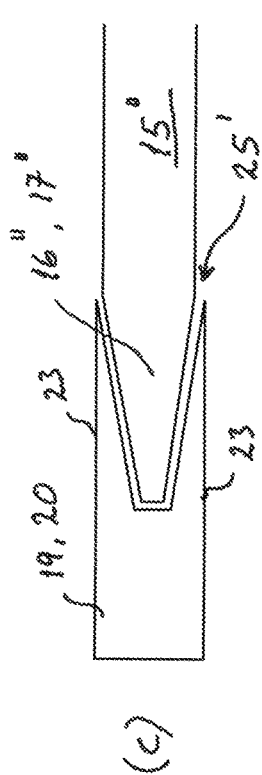
Fig. 10

WIND TURBINE WITH A SUPERCONDUCTIVE GENERATOR HAVING AN IMPROVED THERMALLY INSULATING STRUCTURE

This application claims the benefit of Danish Application No. PA 2015 70843 filed Dec. 21, 2015, Danish Application No. PA 2016 70257 filed Apr. 26, 2016 and PCT/DK2016/050383 filed Nov. 22, 2016, International Publication No. WO 2017/108041, which are hereby incorporated by reference in their entirety as if fully set forth herein.

FIELD OF THE INVENTION

The present invention relates to a wind turbine with a conductive generator and an assembly of a superconductive generator thereof, wherein the generator comprises a rotor arranged rotatably relative to a stator, the rotor comprises a back iron thermally insulated from a rotor structure, the rotor further comprises a plurality of pole units arranged relative to the back iron, each pole unit comprises rotor coils made of a superconductive material, the stator comprises a plurality of pole units with stator coils, wherein the rotor coils are configured to interact with the stator coils via an electromagnetic field when the rotor is rotated relative to the stator.

BACKGROUND OF THE INVENTION

It is known that superconductive generators thermally separate the warm rotor structure from the cold superconducting pole units in order to minimise the total mass that need to be cooled down to the cryogenic operating temperature. This in turn enables the cooling capacity of the cooling system to be reduced.

EP 2521252 A1 solves this problem by arranging the superconducting pole units in individually ladder-shaped cryostats which in turn are arranged on a supporting back iron directly connected to a rotor structure. This configuration provides a complex and expensive solution that adds to the total assembly time. This design further requires that the superconductive coils are supportably arranged within each individual cryostat which further adds to the complexity of this solution.

US 2008/0079323 A1 discloses an alternative solution wherein the superconductive coils are supportably arranged within a bracket shaped back iron. This back iron is also kept below the critical temperature of the superconductive material. The cold back iron is spaced apart from the warm rotor structure by means of a plurality of thermally support blocks. The cold back iron is further connected to the rotor structure by means of thermally insulating bolts. The individual bolts and support blocks add to the complexity and costs of the solution. This configuration also requires an accurate alignment of the individual support block in order to enable the back iron to be positioned correctly so that the bolts can be mounted to the rotor structure.

Thus, there is a need for an improved thermally insulating support structure that allows for a simple and inexpensive mounting of the back iron.

OBJECT OF THE INVENTION

An object of this invention is to provide a support structure that solves the above-mentioned problems.

An object of this invention is to provide a support structure that is capable of adapting to the tolerances of the individual components.

An object of this invention is to provide a support structure that provides an improved thermal insulation between the rotor structure and the back iron.

An object of this invention is to provide an assembly method that allows for a quick and simple mounting of the back iron.

DESCRIPTION OF THE INVENTION

An object of the invention is achieved by a wind turbine comprising:
  a wind turbine tower,
  a nacelle arranged on top of the wind turbine tower,
  a rotatable hub arranged relative to the nacelle, which hub is connected to at least two wind turbine blades,
  a generator rotatably connected to the hub, wherein the generator comprises a rotor arranged rotatably relative to a stator, the rotor comprises a back iron and a rotor structure, the rotor further comprises at least one pole unit arranged relative to the back iron, the at least one pole unit comprises at least one rotor coil made of a superconductive material, the stator comprises at least one pole unit with at least one stator coil, wherein the at least one rotor coil is configured to interact with the at least one stator coil via an electromagnetic field when the rotor is rotated relative to the stator, wherein the rotor further comprises at least one support element arranged between the back iron and the rotor structure, the at least one support element comprises a first end connected to the back iron and a second end connected to the rotor structure, wherein the at least one support element is made of a thermally insulating material, characterised in that the back iron comprises a side surface facing the rotor structure and the rotor structure comprises a corresponding side surface facing the back iron, wherein the first end is connected to the side surface and the second end is connected to the corresponding side surface, wherein the first and second ends extend in an axial direction defined by the rotor.

The terms "plate" and "plate shaped element" are defined as a plate having a length and a width which both are at least four times the thickness of the plate. The plate forms two large side surfaces having any suitable surface profile, including a planar, a curved, a corrugated, or any other suitable surface profile. The terms "beam" and "beam shaped element" are defined as a beam having a length and a width, wherein the width is no more than four times the thickness of the beam.

This provides a simple and inexpensive mounting of the back iron and the rotor structure which also improves the thermal insulation between cold back iron and the warm rotor structure. The thermally insulating plates also provide a flexible mounting interface that is able to adapt to the tolerances of the individual components which in turn allows for a more simple and faster assembly process. Compared to conventional mounting solutions using tension rods, no moving ball and socket arrangements are needed and thus no moving parts are located within the vacuum chamber.

The rotor structure and an outer housing connected to the rotor structure form an enclosed chamber in which the back iron and the superconducting pole units are arranged. The outer housing may be defined by a front or outer wall, end walls, and, optionally, intermediate back or inner wall parts.

The rotor structure, e.g. a yoke thereof, may form at least a part of the back or inner wall of the outer housing. The respective wall parts may be firmly connected, e.g. via bonding or welding, or mounted together, e.g. via bolts or screws. Sealing means, e.g. deformable rubber elements or welds, may be used to form an airtight seal between the respective wall parts. Thus, the outer housing forms an enclosed chamber which can be evacuated so it forms a vacuum chamber. In example, the thickness of the outer housing, e.g. the wall parts thereof, may be between 1 mm and 20 mm, e.g. between 5 mm and 10 mm.

The present configuration is suitable for any type of wind turbines comprising a generator wherein the rotor and, optionally, also the stator comprise superconductive coils. The use of thermally insulating plates reduces the total mass of the cold side, i.e. the superconducting pole units and the back iron, which in turn reduces the required cooling capacity of the cooling system. The plates also allow for a cheap and simple manufacturing process compared to conventional thermally insulating tension rods.

The rotor and stator extend in an axial direction defined by the central rotational axis of the generator. The rotor and stator further extend in a radial direction perpendicular to the axial direction. The back iron has two ends facing in opposite axial directions and a side surface facing the rotor structure. Likewise, the rotor structure has two ends facing in opposite axial directions and a side surface facing the back iron. The back iron of the rotor is spaced apart from the rotor structure by means of a number of support elements, i.e. at least two, situated between the two ends of the rotor. The number of support elements may be selected based on the specific configuration and dimensions of the generator. In example, said number of support elements may be between 3 and 20, e.g. between 5 and 12, e.g. 8 or 10. In example, this space between the back iron and the rotor structure may have any suitable radial length, such as up to 500 mm, e.g. between 100 mm and 300 mm. This allows the cold back iron to be thermally insulated from the warm rotor structure. This spacing may be evacuated to further insulate the cold components from the surround warm components.

According to one embodiment, the at least one support element is orientated relative to the rotational direction of the rotor, wherein the at least one support element from the first end towards the second end substantially extends in the same direction as a rotational direction of the rotor.

Each support element has a first end facing the side surface of the back iron and a second end facing the side surface of the rotor structure, wherein the first and second ends extend in the axial direction. The support element is placed in a first angled position relative to a tangential direction of the side surface of the back iron. The support element is further placed in a second angled position relative to a tangential direction of the side surface of the back iron, e.g. parallel to the tangential direction. The first and second angles are measured along a line extending through the first and second ends of the respective support element. In example, the first angle may be between 20 degrees and 80 degrees, e.g. 25 degrees and 60 degrees, e.g. between 30 degrees and 40 degrees. In example, the second angle may be between 0 degrees and 80 degrees, e.g. 20 degrees and 60 degrees. This allows the support elements to be substantially orientated in the same or opposite direction as the rotational direction of the rotor.

This also allows torque and other forces to be transferred from the back iron, and thus from the superconducting pole units, to the rotor structure.

The support elements may be distributed along the side surface of the rotor structure around the circumference of the rotor structure. Optionally, one or more of these support elements may be defined by a set of support elements aligned in the axial direction. Each set may comprise a number of individual support elements, i.e. at least two, wherein their respective ends are aligned with each other in the axial direction. This allows the respective support element to be formed as a single continuous support element or a set of individual support elements. This allows for an easier handling of the support elements during the assembly process.

Optionally, the rotor may further comprise one or more support elements which are arranged relative to the above-mentioned support elements. In example, these further support elements are positioned symmetrically relative to the above-mentioned support elements so they substantially extend in the opposite direction relative to the above-mentioned support element. The further support element and the above-mentioned support element may form a single V-shaped support element wherein the first end is defined by an intermediate area located between the two second ends, or vice versa. Alternatively, the further support element and the above-mentioned support element may be separate support elements. These further support elements also allow torque and other forces to be transferred from the back iron, and thus the superconducting pole units, to the rotor structure.

According to one embodiment, at least one beam shaped element is arranged at at least one of the first and second ends, wherein the at least one beam shaped element extends in the axial direction.

The support elements may in example be shaped as plates and a number of beams, i.e. at least one, may further be arranged on one or both side surfaces of the rotor structure and the back iron. Said number of beams may correspond to the number of plates.

Optionally, one or more of these beams may be defined by a set of individual beams aligned in the axial direction. The number of beams in each set may correspond to the number of plates in each set. A first beam is arranged at the first end of the plate and a second beam is arranged at the second end of the plate. Each beam is configured to connect the respective plate to the back iron or the rotor structure.

Each beam extends in the axial direction and has a first end facing a respective plate and an opposite end facing away from the respective plate, when installed. Each beam further has at least one side surface (in the radial direction) facing the back iron or the rotor structure. Optionally, each beam further has another side surface facing in the opposite direction which acts as a contact surface for contacting the respective side surface of the back iron or the rotor structure.

The beams have a length measured in the axial direction and a width measured between the first and second ends, e.g. in the tangential direction. The tangential direction is perpendicular to the axial and radial directions of the rotor and stator. The thickness of the beams is measured between the two side surfaces or between the side surface of the back iron or the rotor structure and the side surface of the beam. In example, the thickness and/or length of the beam is equal or greater than the corresponding thickness and/or length of the plate or set of plates.

According to one embodiment, the at least one of the first and second ends and the at least one beam shaped element are firmly connected by mounting means or bonding means.

The beams may form part of the rotor structure, e.g. a yoke thereof, and/or the back iron, and thus the beams may project outwards from the side surface of the rotor structure or back iron. This allows the beams to be formed in the same manufacturing process as the rotor structure or back iron. This reduces the total assembly time and the number of required assembly steps. Alternatively, the beams may be formed as separate elements which may be firmly connected to the rotor structure or the back iron. In this configuration the side surface of the rotor structure and/or back iron also act as a contact surface for contacting a corresponding side surface on the respective beams. Optionally, the side surface of the rotor structure and/or back iron may comprise a number of predetermined areas which are prepared for receiving and holding the respective beams. In example, one or more of these areas may include a recess configured to follow the shape of the corresponding beam and/or holes for mounting the beams as described below. Each area defines a connection point which allows the beams to be selectively positioned in one or more areas.

The beams may be mounted to the rotor structure and/or back iron using mounting means, e.g. bolts and optional nuts, screws, or other suitable mounting means. The beams may comprise a first set of through holes configured to receive these mounting means. Likewise, the rotor structure and/or back iron may comprise a plurality of corresponding holes, e.g. through holes, configured to receive the mounting means as mentioned above. Alternatively or additionally, the beams may be bonded to the rotor structure and/or back iron using bonding means, e.g. glue or other suitable bonding means. The specific bonding mean/glue may be selected so that it has high bonding properties to the materials of the rotor structure, the back iron and/or the beams. In example, the bonding mean/glue may be a two-component epoxy, e.g. Araldite® 2015. This allows the respective beams to be firmly connected to the rotor structure and/or back iron. The beams may also be firmly connected by other means, e.g. welding.

Each beam may further comprise a second set of holes, e.g. through holes, configured to receive other mounting means for mounting the respective plate to the beam. These mounting means may be bolts and optional nuts, screws, pins, or other suitable mounting means. The wet laminate of the plate may in example be positioned relative to these holes in the respective beam, and said pins may be pushed through the wet laminate before it is cured. This allows the fibres inside the laminate to be pushed aside without breaking. This, in turn, increases the structural strength of the plate around the holes formed by the pins, in particular when subjected to tension forces. Alternatively, bushings may be inserted into holes in the plate and optionally bonded to the plate for added structural strength. This allows the beam and the respective plate to be firmly connected by using mounting means.

Alternatively or additionally, the beam may be bonded to the respective plate using bonding means, e.g. glue or other suitable bonding means. The specific bonding mean/glue may be selected in order to have high bonding properties for the materials of the rotor structure and/or the beams. In example, the bonding mean/glue may be a two-component epoxy, e.g. Araldite® 2015. The bonding mean/glue is applied to one or more contact surfaces on the beam and/or on a corresponding number of contact surfaces on the plate. This forms a suitable bond between the plate and the beam which allows the beam and the respective plate to be firmly connected.

The first set of holes may be arranged on the end surfaces of the first and second ends while the second set of holes may be arranged on the side surfaces mentioned earlier. Alternatively, both the first and second sets of holes may be arranged on the side surfaces, e.g. in two different rows.

According to one embodiment, the at least one of the first and second ends and the at least one beam shaped element are firmly connected by a combination of mounting means and bonding means.

The plate and the beam may optionally be connected via a combination of mounting means and bonding means. The beam and the rotor structure may further be connected via a combination of mounting means and bonding means. This provides a strong connection capable of transferring loads and forces, e.g. compression and tension forces, between the back iron and the rotor structure. This also allows the respective components to remain firmly connected even if the bond should fail, e.g. due to crakes or loss of bond.

According to one embodiment, the at least one beam shaped element forms part of the at least one of the first and second ends.

The first and/or second beam may instead form part of the respective plate, e.g. as a thickened first and/or second end. In this configuration, the second set of holes may be omitted and the mounting means may be inserted into another second set of holes in the respective beam. Bushing may be inserted into these holes and, optionally, bonded to the respective beam for added structural strength. Alternatively, the first and/or second beam may be firmly connected to the back iron and/or rotor structure by suitable pins or threaded rod that are pushing through the wet laminate of the respective beam before it is cured. This allows the fibres inside the laminate to be pushed aside without breaking, which in turn increases the structural strength of the beam around the holes formed by these pins or threaded rods.

Alternatively or additionally, the respective beam may in this configuration be bonded to the back iron and/or rotor structure using bonding means, e.g. glue or other suitable bonding means. The specific bonding mean/glue may be selected in order to have high bonding properties for the materials of the respective beam, the back iron and/or the rotor structure. In example, the bonding mean/glue may be a two-component epoxy, e.g. Araldite® 2015. The bonding mean/glue is applied to one or more contact surfaces on the beam and/or on a corresponding number of contact surfaces on the back iron or on the rotor structure. This forms a suitable bond between the respective beam and the back iron or between the respective beam and the rotor structure.

According to one embodiment, the at least one beam shaped element comprises at least one relief element, e.g. a relief groove, configured to reduce stresses in the at least one beam shaped element.

The first and/or second beam may optionally comprise a number of relief elements, i.e. at least one, configured to reduce the stresses in the respective beam caused by the thermal deformation of this beam. The relief elements may be configured as relief grooves formed in one or both side surfaces of the respective beam. Other shapes may be used to relief thermal stresses in the beams. The relief elements may each extend in the axial direction and may be arranged in one or more rows. This reduces the stresses in the beams due to the thermal deformation of the beams.

According to one embodiment, one of the at least one of the first and second ends and the at least one beam shaped element has a wedge shaped end facing the other of the at least one of the first and second ends and the at least one beam shaped element, wherein said other of the at least one of the first and second ends and the at least one beam shaped element has a corresponding end shaped to receive said wedge shaped end.

The respective beam and the plate may be configured to form at least one overlapping joint defined by at least the first end of the beam and the respective end of the plate. At least one of the first end of the beam and the respective end of the plate may comprise at least one projecting part that extends towards the opposite facing end. At least the other of the respective end of the plate and the first end of the beam may comprise at least one corresponding groove or notch configured to receive this projecting part. Alternatively, both ends of the beam and the plate may comprise at least one projecting part and at least a corresponding groove or notch. Said projecting parts and corresponding grooves or notches both form at least two opposite facing contact surfaces. The above-mentioned bonding mean/glue may be applied to one or more of these contact surfaces. This increases the total surface area between the two ends and, thus, allows for a stronger bond between the respective beam and the plate.

The first end of the beam may be wedge shaped wherein the thickness of this wedge shaped end tapers towards its end surface. Alternatively, one or more of the projecting parts mentioned above may be wedge shaped wherein its thickness tapers towards its end surface. The corresponding groove or notch may thus be shaped to follow the contours of this wedge shaped part. This distributes the stresses in the beam and in the plate more evenly and prevents stresses from concentrating at the overlapping joint.

Optionally, the respective beam may further form another overlapping joint defined by the second end of the beam and the respective end of a further plate. This allows the ends of two plates to be connected to the same beam. Alternatively, the grooves or notches may be omitted and the plate area or plate ends may be sandwiched between the beam and the back iron or between the beam and the rotor structure instead. The beam and plate area/plate ends are then mounted and/or bonded to the back iron or to the rotor structure. If no separate beams are used, then the plate area and the overlapping plate ends may optionally be mounted and/or bonded directly to the back iron or to the rotor structure.

According to one embodiment, the at least one support element comprises at least one reinforcing element which extends between the first end and the second end.

One or more of the plates may comprise a number of reinforcing elements, i.e. at least one, configured to add stiffness to the respective plates during operation. The reinforcing elements extend from the first end to the second end, or vice versa. The reinforcing elements may form part of the plate, or be firmly connected to the plate by mounting, bonding, welding, or other techniques. In example, the reinforcing elements may be corrugations, saw-teeth, trapezoid shaped elements, stiffeners, or other suitable reinforcing elements. The reinforcing elements may project outwards on one or both side surfaces of the plate. This adds structural strength to the plates and prevents it from buckling due to compression forces.

According to one embodiment, the at least one support element is made of a fibre reinforced material, e.g. fibre reinforced plastics.

The support elements are of any thermal insulating materials or composites having low thermal conductive properties. The support elements are in example made of a fibre reinforced material, such as fibre reinforced plastics (FRP). The fibres may be organic, carbon, glass fibres, or other suitable fibres. The beams mentioned earlier may be made of the same material, or composite, as the support elements, or of a different material or composite. The beams may be made of metal, such as aluminium or steel, or composites, such as fibre reinforced plastics, or another suitable material or composite thereof. In example, the materials of the support elements, the beams and, optionally, the bonding mean/glue may be selected so that they have the same, or at least substantially the same, thermal deformation properties in one or more directions.

The material or composite of the support element, e.g. the plates, is selected so that it has sufficient structural strength while at the same time enabling it to adapt, e.g. flex, to the tolerances of the respective individual components and to the thermal contraction of the cold back iron relative to the warm rotor structure. This allows for cheaper and more simple manufacturing and assembly process compared to conventional solutions using thermal insulating rods.

The support elements have a length measured in the axial direction and a width measured between the first and second ends, e.g. in a combined radial and tangential direction. The thickness of the support element is measured between the side surfaces facing the back iron and the rotor structure. In example, the length may be up to 1500 mm, e.g. between 800 mm and 1200 mm. In example, the width may be up to 3800 mm, e.g. between 500 mm and 2500 mm. In example, the thickness may be between 10 mm and 50 mm, e.g. between 20 mm and 40 mm, or even greater than 50 mm as mentioned later. The thickness may be measured at a central part located between the two ends or at one of said ends.

The back iron and the rotor structure may be made of any suitable material or alloys, such as steel, iron (e.g. FeNi) or another suitable material or alloy.

According to one embodiment, the at least one support element is made of a first layer sandwiched between at least two second layers, wherein one of the first layer and the at least second layer has a greater structural strength than the other layer.

The support elements, e.g. the plates, may have a sandwiched structure comprising a first layer and at least a second layer. In example, the plate may comprise a central/first layer and at least an outer/second layer located on either side of the central/first layer. The first layer may be configured to provide thermal insulation to the plate while the second layer is configured to provide structural strength to the plate, or vice versa. The first and second layers may have the same or different thermal insulating properties. This allows the plate to have suitable structural strength while acting as a thermal barrier between the warm and cold beams.

According to one embodiment, a plurality of support elements are arranged relative to each other along an axial direction defined by the rotor.

Instead of using a single continuous support element, a plurality of support elements may be arranged along the axial direction between the back iron and the rotor structure and aligned relative to each other. Each individual support element has a first end facing the back iron and a second end facing the rotor structure. This divides the total contact area between the respective support element and the back iron or between each respective support element and the rotor structure into a plurality of individual contact areas. This also provides a strong support structure with a reduced surface area for each support element.

According to one embodiment, at least one mounting element is arranged at at least one of the first and second ends of each of the plurality of support elements, wherein the at least one mounting element is firmly connected to at least one of the back iron and the rotor structure.

Instead of beams, one or more mounting elements may be arranged at the first and/or second ends of the individual plates. In example, a first mounting element may be arranged at the first end and a second mounting element may be arranged at the second end of each plate. The mounting elements are made of metal, such as aluminium or steel, or composites, such as fibre reinforced plastics, or another suitable material or composite thereof. This allows the individual plates to be firmly connected to the back iron and/or the rotor structure.

The first and/or second mounting elements may alternatively form part of the respective plate, e.g. as a thickened first and/or second end. This allows the mounting elements to be manufactured in the same manufacturing process as the plates.

Each mounting element extends in the axial direction and has a first end facing a respective plate and an opposite end facing away from the respective plate, when installed. Each mounting element further has at least one side surface (in the radial direction) facing the back iron or the rotor structure. Optionally, each mounting element further has another side surface facing in the opposite direction which acts as a contact surface for contacting the respective side surface of the back iron or the rotor structure.

According to one embodiment, the plurality of support elements comprise at least one first support element and at least one second support element, wherein the at least one first support element from its first end towards its second end substantially extends in one direction relative to a rotational direction of the rotor, and the at least one second support element from its first end towards its second end substantially extends in an opposite direction.

The individual support elements, e.g. plates, may be orientated relative to the rotational direction of the rotor so they all substantially extend in the same or opposite direction as the rotational direction. Alternatively, a first support element may substantially extend in the same direction as the rotational direction while a second support element may substantially extend in the opposite direction as the rotational direction. The first and second support elements may be located in the same tangential plane or be angled relative to each other in the radial plane. In example, the first support element may be placed in any angle between 0 degrees and 180 degrees relative to the second support element.

One end, or both ends, of the first and second support elements may be aligned tangentially so that the respective first and/or second mounting elements thereof are aligned along a common axial line. This reduces the total amount of machining of the back iron and/or rotor structure. Alternatively, one end, or both ends, of the first and second support elements may be offset relative to each other in the tangential direction so that the respective first mounting elements thereof are aligned along one axial line while the respective second mounting elements thereof are aligned along another parallel axial line. This allows the length of the first and second support elements, and thus the thermal insulation of the support elements, to be optimised.

The first and second support elements may further be offset relative to each other in the axial direction or be aligned with each other in the radial plane. The respective first or second mounting elements of the first and second support elements may be formed as a single mounting element or separate mounting elements. If they are aligned radially, the first and second support elements may form a single support element extending through an intermediate mounting element acting as the first or second mounting element.

According to one embodiment, the plurality of support elements comprise a first set of support elements and at least a second set of support elements, wherein at least one of the support elements of the first set intersects at least one of the support elements of the at least second set.

The individual support elements, e.g. plates, may further be arranged in sets along the circumference of the rotor structure. The individual sets may be arranged relative to each other so that they intersect each other. In example, a first plate of one set and a second plate of an adjacent set may be arranged so that they intersect each other at an intersection point, and vice versa. This also allows the lengths of the individual plates to be optimised to achieve a minimal thermal conduction and, thus, an improved thermal insulation. This further allows the plates to be placed at an optimal angle relative to the rotor structure which allows for an optimal force transfer and saves material of the rotor structure.

According to one embodiment, the plurality of support elements comprise a first set of support elements and at least a second set of support elements, wherein the at least one mounting element of the first set and the at least one mounting element of the at least second set are aligned along a common axial line.

The individual support elements, e.g. plates, may alternatively be arranged relative to each other so that they do not intersect each other. In example, the first plate of one set and the second plate of an adjacent set may be positioned relative to each other so that their respective first and/or second ends are substantially aligned along a common axial line, e.g. defined by the respective mounting elements. This also allows for the use of shorter plates and requires less machining of the back iron and/or rotor structure. This also allows for a faster and a more simple installation, e.g. wrapping, of a thermal insulating laminate around the plates and optionally the mounting elements since the plates do not intersect each other.

This thermal insulating laminate may comprise at least one layer of polyethylene, polyester, or another suitable support material and at least one layer of a reflective material, e.g. aluminium, acting as a mirror against thermal radiation. In example, commercially available superinsulation films or laminates may be used.

According to one embodiment, the at least one mounting element is firmly connected to at least one of the back iron and the rotor structure by mounting means or bonding means or a combination thereof.

The respective mounting elements may be firmly connected to the support element, the back iron and/or the rotor structure using mounting means and/or bonding means as described earlier. In example, the mounting element may have a set of holes or through holes configured to receive mounting means, such as bolts or screws. The back iron and/or rotor structure may also comprise a set of holes or through holes configured to receive the mounting means. The mounting means may optionally be pretensioned in order to ensure a firm connection between the respective mounting element and the back iron or between the respective mounting element and the rotor structure.

The back iron and/or rotor structure may comprise a number of protrusions, i.e. at least one, located on the respective side surface. Each protrusion may extend in the axial direction and may project outwards from the respective side surface. Each protrusion may have at least one contact surface for contacting a corresponding contact surface on the individual mounting elements. The individual mounting elements can then be firmly connected to the respective protrusion. Alternatively, the first end of the respective mounting element may be placed in an angled position, e.g. between 20 degrees and 80 degrees, relative to the tangential direction of the respective side surface of the back iron or of the rotor structure. The individual mounting elements can then be firmly connected directly to the side surface of the back iron or of the rotor structure without the use of protrusions.

According to one embodiment, the at least one mounting element is firmly connected to the at least one support element by at least one pin connection.

The mounting element may alternatively be firmly connected to the respective support element by means of one or more pin connections. The support element, e.g. the first and/or second support element, may comprise at least one through hole, e.g. two or more, extending in the axial direction for receiving and holding the pin. The first and/or second end of the support element may comprise one or more projecting elements in which the through holes are located. The mounting element, e.g. the first and/or second mounting element, may comprise at least one, e.g. two or more, complementary projecting elements extending towards the support element. The projecting elements and complementary projecting elements may be shaped as knuckles or plate members. The pin may comprise means for locking the pin into position, e.g. holes for receiving a locking pin, a bolt head, a threaded coupling for mounting a nut, or other suitable locking means. This enables the first and second support elements to rotate during operation while transferring shear loads in the radial and tangential directions to the back iron or to the rotor structure.

The mounting element may further comprise one or more cut-outs for saving weight and material. In example, one cut-out may be arranged relative to the pin so that the height of the pin coupling, i.e. the rotation axis, can be lowered towards the side surface of the back iron or of the rotor structure. This reduces the moment arm and requires less material for transferring the loads to the back iron or to the rotor structure respectively.

A pre-tension force may be applied to the individual pin connections during installation to limit the compression during the cooling down of the cold components. The first mounting element may be configured as a common mounting element for the first and second plate, wherein the projecting elements of both plates are connected to the same pin. This reduces the total number of mounting elements.

The shape of the mounting element may be optimised to enable an optimal transfer of loads to the back iron or to the rotor structure. This may be achieved by providing the mounting element with one or more finger-shaped elements which is then mounted or bonded to the back iron or to the rotor structure, by increasing the bonding surface area, or by increasing the distance between the individual mounting/ bonding points or areas. In example, the mounting element may comprise at least four fingers or finger-shaped elements extending outwards from the mounting element in the tangential and/or axial direction. This reduces the weight of the mounting element and saves material.

According to a special embodiment, the at least one support element has a thickness between 80 millimetres and 120 millimetres.

The support element may have an increased thickness at the first and/or second end compared to the thickness of the central part. This increases the structural strength around the through hole. This also reduces the risk of delamination in the support element which could result in a failure in the pin connection. Alternatively, the support element may have a constant thickness along its entire length, i.e. the thickness at the ends and at the central part is the same. The support element may optionally have one or more cut-outs arranged in the side surfaces for saving material and weight. This prevents the support element from buckling during operation due to compression forces.

The support elements may alternatively be shaped as beams wherein the beams may be firmly connected to the respective mounting elements, e.g. by means of the above-mentioned pin connections. In example, the beams may have a thickness, e.g. measured at one end, between 80 mm and 120 mm. In example, the beams may have a length between 180 mm and 220 mm. This allows for a reduced number of support elements while increasing the contact area of each support element.

The required structural strength of the laminate in the first and/or second end may be achieved by arranging the individual layers of fibre mats around a temporary pin or rod defining the through hole. The pin or rod is then removed after curing. Alternatively, the through holes may be drilled into the first and/or second end after curing. Optionally, a bushing may be arranged in the through hole for added structural strength. Other known techniques may be used to provide the required structural strength.

An object of the invention is also achieved by a method of assembling a generator of a wind turbine as described above, wherein the method comprises the steps of:

providing a rotor of a generator, wherein the rotor at least comprises a rotor structure, arranging a back iron of the rotor relative to the rotor structure, positioning at least one support element relative to the rotor structure and the back iron, mounting a first end of said at least one support element to the back iron, and further mounting a second end of said at least one support element to the rotor structure.

The present configuration allows for a simple and cheap assembly process of the rotor that minimises the total mass that needs to be cooled down. The present assembly method further provides a flexible mounting of the back iron and the rotor structure that does not require a very precise alignment of the individual components and is able to adapt to the tolerances of the individual components. Unlike conventional methods, no ball and socket arrangements are needed in the vacuum chamber for mounting the cold back iron to the rotor structure.

Use of plates to thermally separate the back iron from the rotor structure allows for a better thermal insulation between the cold components and the warm components. No thermal insulating blocks or thermal insulating bolts and corresponding grooves are needed. The cold components, e.g. the back iron and superconducting pole units, can be manufactured and, optionally, assembled separately from the warm components, e.g. the rotor structure, the housing, and the drive shaft.

According to one embodiment, the at least one support element is arranged between a side surface of the back iron and a corresponding side surface of the rotor structure, wherein the at least one support element is angled relative to a tangential direction of at least one of the side surface and the corresponding side surface.

The support elements, e.g. plates or beams, are located between either ends of the rotor and are orientated in relation to the rotational direction of the rotor so that the first and second ends extend parallel to the axial direction of the rotor. The support elements may thus extend in a combined radial and tangential direction. The individual support elements or sets of support elements are placed in an angled position so that the first and second ends are radically offset relative to each other. The support elements thus act as spokes and allow torque and other forces to be transferred from the back iron, and thus from the superconducting pole units, to the rotor structure. Transition loads from the superconducting pole units, e.g. in the event of short circuiting of the superconducting pole units, are also transferred to the rotor structure via these plates. The back iron may have an outer diameter of 2000 mm to 4000 mm, e.g. between 2500 mm and 3500 mm.

The rotor structure may form part of the drive shaft, or be mounted to the drive shaft. The rotor structure may comprise a yoke facing the back iron and an inner support part facing the drive shaft. The yoke and inner support part may be formed as a single piece, or be connected by using mounting means (e.g. bolts and nuts), welding, or other suitable techniques. The inner support part may comprise one or more reinforcing elements and, optionally, one or more cut-outs. This reduces the weight and saves material of the rotor.

The back iron and/or yoke may have a thickness measured in the radial direction of up to 120 mm, e.g. between 50 mm and 100 mm, e.g. between 70 mm and 80 mm.

According to one embodiment, the first or second end is mounted to the back iron or to the rotor structure before arranging the back iron relative to the rotor structure.

One or more of the support elements may be positioned relative to, and firmly connected to, the respective rotor structure or back iron. The back iron may then be placed in its installation position and any remaining support elements may be positioned relative to the back iron or rotor structure afterwards and finally firmly to said back iron or rotor structure. This allows the support elements to be used to guide the back iron into alignment with the rotor structure.

After the back iron and the super conduction pole units have been installed, the rest of the outer housing may be mounted to the rotor structure. The rotor structure, e.g. the yoke thereof, may act as a back wall of the housing to which an end wall at either end can be mounted, e.g. via an intermediate back wall part. The end wall may further be mounted to a front wall located between the back iron and the stator. A vacuum system can be used to evacuate the enclosed chamber defined by the outer housing. This forms a vacuum chamber in which the superconducting pole units are located and wherein the evacuated space also provides thermal insulation between the cold components and the warm components, e.g. the outer housing and the rotor structure, surrounding the cold components.

Finally, the electrical connections and cooling connections may be coupled to the superconducting pole units so that the superconductive coils can be cooled to a cryogenic operating temperature. The superconductive coils are configured to interact with a plurality of corresponding stator coils of pole units located in the stator via an electromagnetic field when the rotor is rotated relative to the stator. The cold components, e.g. the superconductive coils, may be operated at a cryogenic operating temperature between 10 K and 70K. The warm components, e.g. the rotor structure, may be operated at an ambient temperature, e.g. between 250 K and 350 K.

According to one embodiment, the method further comprises the step of:
arranging at least one beam shaped element on at least one of the side surface and the corresponding side surface, and positioning at least one of the first and second ends relative to said at least one beam shaped element.

A set of first beams may, for example, be arranged on the side surface of the back iron in a number of predetermined areas and/or another set of second beams may be arranged on the corresponding side surface of the rotor structure. The first and second beams may be aligned parallel to the axial direction. This may be before or after the back iron is positioned and alignment with the rotor structure.

The individual plates may then be positioned relative to the individual first and second beams to enable the back iron to be connected to the rotor structure. This may be done after the back iron is placed in its installation position. The beams and/or plates may be slid into position in the axial direction or in the tangential direction. The back iron may be placed in a pre-installation position relative to the rotor structure wherein the beams and plates may be used to guide the back iron into its final installation position. This reduces the complexity of the assembly process and also reduces the total assembly time compared to other conventional assembly methods as a very precise alignment of the back iron is not required in order to mount the thermal insulating support elements.

One or more further plates may be arranged relative to the above-mentioned plates and connected to the back iron and rotor structure via separate first and second beams. In example, these further plates are positioned symmetrically relative to the above-mentioned plates so that they substantially extend in the opposite direction. Alternatively, these further plates may be connected to the same first and/or second beams as the above-mentioned plates. These further plates may also act as spokes and allow torque and other forces to be transferred from the back iron, and thus the superconducting pole units, to the rotor structure.

According to one embodiment, the at least one beam shaped element and the at least one of the first and second ends is firmly connected by using mounting means and/or bonding means.

The first and second beams may be firmly connected to the back iron and rotor structure, e.g. the yoke thereof, by using suitable mounting and/or bonding means. This may be done before or after the back iron is placed in its installation position. The first and second beams may be installed before moving the back iron into position relative to the rotor structure as this allows for easy access to the beams and, optionally, the mounting means thereof.

The first and second beams may further be firmly connected to the respective plates by using suitable mounting and/or bonding means. This may be done before, during or after the back iron is moved into its final installation position. The plates may be installed by using bonding means so that the respective beams and the plate form overlapping joints.

Alternatively, the method further comprises the step of:
firmly connecting at least one beam shaped element to at least one of the first and second ends, and positioning said at least one beam shaped element relative to at least one of the side surface and the corresponding side surface before mounting said at least one support element to the back iron and the rotor structure.

In this configuration, the first and second beams may be firmly connected to the individual plates during or after the manufacturing process of these plates. The back iron may then be positioned relative to the rotor structure in its installation position. Afterwards, the plates with said beams connected may be positioned relative to and firmly connected to the back iron and rotor structure. This allows the plates and the first and second beams to be pre-assembled prior to installation.

According to one embodiment, the step of positioning the at least one support element comprises arranging a plurality of support elements along an axial direction defined by the rotor.

During assembly, a plurality of support elements may be arranged along the axial direction and orientated relative to the rotational direction of the rotor. In example, between 2 and 15, e.g. between 5 plates and 10, e.g. 3 or 4, support elements are arranged along the axial direction. These support elements may be placed in an angled position relative to a tangential direction of the side surface of the back iron and of the rotor structure as mentioned above. This allows for a quick and easy handling and positioning of the individual support elements. This also provides a strong support structure having a reduced total surface area which reduces the heat transfer between the rotor structure and the back iron.

According to one embodiment, the method further comprises the step of:
arranging at least one mounting element at at least one of the first and second ends of each of the plurality of support elements.

The individual plates, e.g. support elements, may in example be outfitted with one or more mounting elements, e.g. during or after the manufacturing of these plates. The mounting elements may be firmly connected to plates using mounting means and/or bonding means as described earlier. A first mounting element of the respective plate is then positioned relative to the side surface of the back iron, e.g. on a protrusion thereof, and firmly connected to the back iron. A second mounting element of the respective plate is then positioned relative to the side surface of the rotor structure, e.g. on a protrusion thereof, and firmly connected to the rotor structure.

According to a special embodiment, the at least one mounting element is firmly connected to said at least one of the first and second ends by at least one pin connection.

The mounting elements may alternatively be firmly connected to the support elements, e.g. plates, using pin connections as described earlier. This allows for an earlier installation as the mounting elements and support elements can be positioned and firmly connected separately. This also allows for an easier installation of the thermal insulating laminate or film as the support elements can be at least partly covered with this laminate or film before or after being connected to the mounting elements.

The first and second mounting elements may be firmly connected to the back iron and rotor structure respectively. The back iron is then moved, e.g. in the axial direction, into its final position relative to the rotor structure. The individual support elements, e.g. the first and second support elements, may afterwards be positioned relative to the first and second mounting elements and the pins may be inserted into the trough holes of the mounting elements and the ends of the plates.

Alternatively, the first mounting elements are firmly connected to the back iron or the second mounting elements are firmly connected to the rotor structure. The individual support elements are then positioned and connected to these mounting elements via the pins. The other mounting elements are further firmly connected to the individual support elements via the pins. The back iron is afterwards moved, e.g. in the axial direction, into its final position relative to the rotor structure. The other mounting elements are then firmly connected to the back iron or to the rotor structure.

In yet another alternative, the first mounting elements are firmly connected to the back iron or the second mounting elements are firmly connected to the rotor structure. The back iron is then moved, e.g. in the axial direction, into its final position relative to the rotor structure. The individual support elements are afterwards connected to the other mounting elements via the pins. The plates with the other mounting elements are then positioned relative to the back iron or to the rotor structure and firmly connected to the back iron or to the rotor structure and the already firmly connected mounting elements.

According to one embodiment, the method further comprises steps of:
positioning at least one first support element relative to the a rotational direction of the rotor so that it substantially extends in one direction, and
positioning at least one second support element relative to the at least one first support element so that it substantially extends in an opposite direction.

Each individual support element, e.g. plate or beam, is orientated relative to the rotational direction of the rotor, e.g. in the same or opposite direction. In example, a first support element is angled relative to the tangential direction of the back iron or of the rotor structure so that it extends substantially along the rotational direction. A second support element is further angled relative to the tangential direction of the back iron or of the rotor structure so that it extends substantially in the opposite rotational direction. The first and second support elements may be arranged in alternating order or in groups along the axial direction. The first support element may further be placed in an angled position relative to the second support element in the radial plane or in the same tangential plane. This allows the arrangement and positions of the first and second support elements to be selected according to the specific configuration of the rotor.

During positioning of the first and second support elements, the second mounting elements of these support elements may be offset relative to each other in axial and/or radial direction. This allows the first and second support elements to be mounted or demounted individually. Alternatively, the second mounting elements of these support elements may be aligned with each other in axial and/or radial direction. This allows the first and second support elements to be mounted or demounted in pairs.

According to one embodiment, at least one of said plurality of support elements intersects at least one other support element.

The first and second support elements may form a set of support elements extending along the axial direction. A number of sets may be arranged along the circumference of the rotor structure. In example, said number of sets may be between 3 sets and 20 sets, e.g. between 6 sets and 16 sets, e.g. between 9 sets and 12 sets. In example, a first plate of one set may be positioned so that it intersects a second plate in an adjacent set. The second plates of this one set may further be positioned so that they intersect a first plate in another adjacent set. The intersection points between the first and second plates may be located between the first and second ends of the respective plates. This allows the distance, e.g. the chord, between the first ends of the first and second plates to be increased compared to the use of a single continuous plate as mentioned above.

This in turn provides an optimal force transfer between the back iron and the rotor structure and saves material of the rotor structure.

The first and second plates may be spaced apart so that they do not accidently rub up against each other and thus causing an accelerated wear during rotation of the rotor.

According to one embodiment, at least one of the support elements, the at least one beam shaped element and the at least one mounting element are manufactured by pultrusion or extrusion.

The various support elements described above may be manufactured by extrusion, pultrusion, or another suitable manufacturing process. This reduces the amount of finishing work, e.g. grinding and polishing. This also reduces the amount of broken fibres in the laminate of the support element. Alternatively, the individual support elements may be cut into the desired dimensions using a larger support element.

Likewise, the beams and/or the mounting elements used to firmly connect the support elements to the back iron or rotor structure may be manufactured by extrusion, pultrusion, or another suitable manufacturing process. The beams and/or the mounting elements may then be machined into their finished configuration using various machine tools. Alternatively, the beams and/or the mounting elements may be formed during the manufacturing of the plates.

The invention is not limited to the embodiments described herein, and thus the described embodiments can be combined in any manner without deviating from the objections of the invention.

DESCRIPTION OF THE DRAWING

The invention is described by example only and with reference to the drawings, wherein:

FIG. 10 shows three embodiments of an overlapping joint between the respective beam and the plate;

FIG. 11 shows three other embodiments of the overlapping joint shown in FIG. 10;

Figure 1:
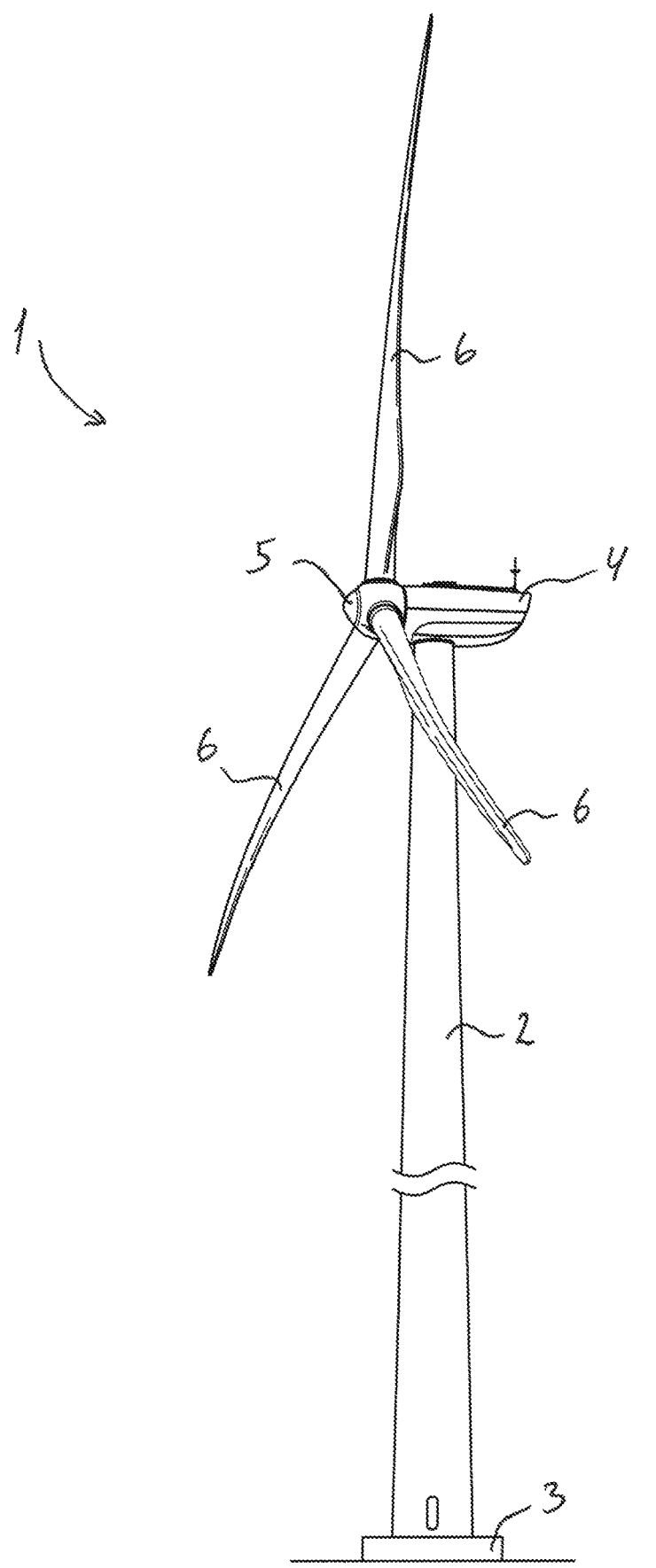
FIG. 1 shows an exemplary embodiment of a wind turbine.

In the following text, the figures will be described one by one, and the different parts and positions seen in the figures will be numbered with the same numbers in the different figures. Not all parts and positions indicated in a specific figure will necessarily be discussed together with that figure.

POSITION NUMBER LIST

1. Wind turbine
2. Tower
3. Foundation
4. Nacelle
5. Hub
6. Wind turbine blades
7. Generator
8. Stator
9. Rotor
10. Pole units with superconductive coils
11. Back iron
12. Rotor structure
13. Side surface of rotor structure
14. Side surface of back iron
15. Support elements, plates
16. First end of plate
17. Second end of plate
18. Rotational direction
19. First beam
20. Second beam
21. First end of beam
22. Second end of beam
23. Side surfaces of beam
24. Mounting means
25. Groove in beam
26. Bonding means
27. Pins
28. Bushings
29. Projecting elements
30. Grooves for receiving projecting elements
31. Support elements, plates
32. First mounting element
33. Second mounting element
34. Through holes of first mounting element
35. Holes of second mounting element
36. Protrusion of back iron
37. Protrusion of rotor structure
38. First plate
39. Second plate
40. Projecting elements, plate members
41. Through hole
42. Pin
43. Fingers
44. First beam, support element
45. Second beam, support element

DETAILED DESCRIPTION OF THE INVENTION

FIG. 1 shows an exemplary embodiment of a wind turbine 1. The wind turbine 1 comprises a wind turbine tower 2 provided on a foundation 3. A nacelle 4 is arranged on top of the wind turbine tower 2 and configured to yaw relative to the wind turbine tower 2 via a yaw system (not shown). A hub 5 is rotatably arranged relative to the nacelle 4, wherein at least two wind turbine blades 6 are mounted to the hub 5, here three wind turbine blades are shown. The hub 5 is connected to a rotary machine in the form of a generator (shown in FIG. 2) arranged in the nacelle 4 via a drive shaft for producing a power output.

Figure 2:
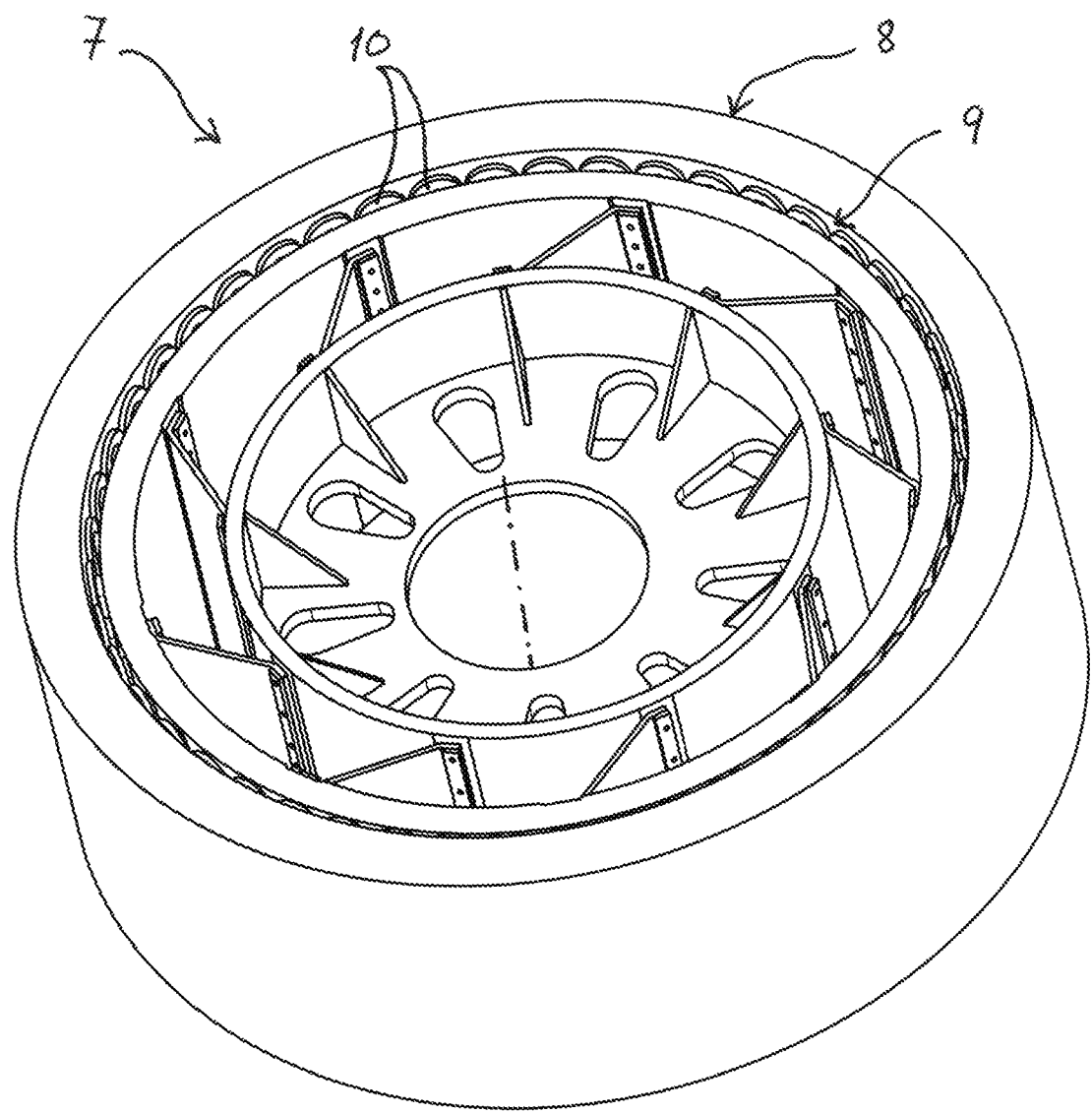
FIG. 2 shows an exemplary embodiment of a generator in the wind turbine.

FIG. 2 shows an exemplary embodiment of the generator 7 connected to the hub 5. Here, only a central rotational axis (indicated by dotted line) of the drive shaft is shown for illustrative purposes. The generator 7 comprises a stator 8 and a rotor 9 rotatably arranged relative to the stator 8. The stator 8 comprises a plurality of pole units (indicated by dotted lines) having stator coils configured to interact with rotor coils located in a plurality of pole units 10.

At least the rotor coils are made of a superconductive material which is operated below its critical temperature. Thus, at least the pole units 10 act as superconducting pole units. The stator coils are made of a conductive material, such as cupper, operated at an ambient temperature.

Figure 3:
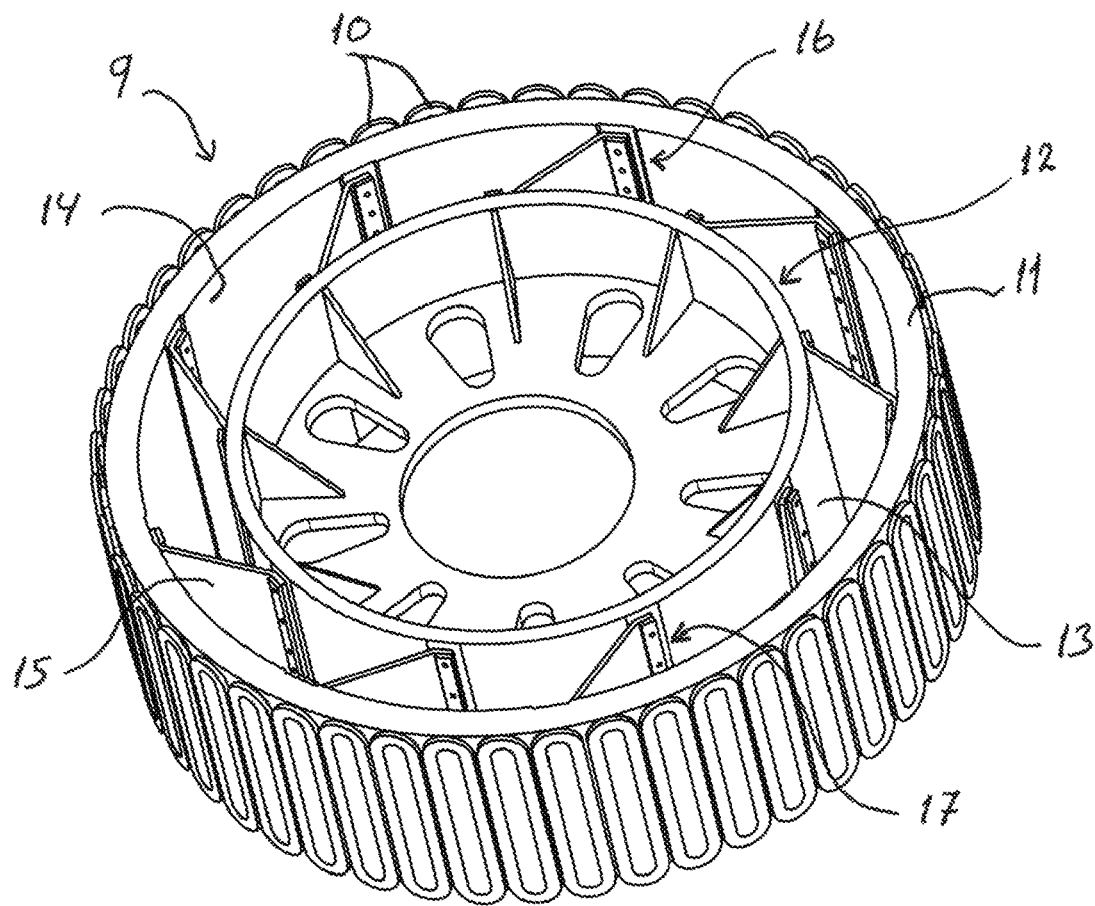
FIG. 3 shows a first embodiment of the rotor of the generator shown in FIG. 2.

FIG. 3 shows a first embodiment of the rotor 9 where the pole units 10 are arranged on a back iron 11 facing the stator 8, e.g. on an outer side surface (shown in FIG. 3). A cooling system (not shown) is used to cool the pole units 10 down to a cryogenic operating temperature between 10 K and 70 K.

The rotor 9 further comprises a rotor structure 12 having an inner support part facing the drive shaft and a yoke facing the back iron 11. The inner support part is here shaped as a disc having one or more cut-cuts as shown in FIG. 2. The inner support part is mounted to the drive shaft using mounting means. The yoke is here shaped as a ring or tubular element having a side surface 13 facing the back iron 11. The back iron 11 is further shaped as a ring or tubular element having a side surface 14 facing the rotor structure 12.

The back iron 11 is spaced apart from the rotor structure 12 by a number of support elements 15 arranged between the side surfaces 13, 14. The support elements are shaped as plates 15 which are made of a thermally insulating material, e.g. fibre reinforced plastics (FRP), so that the back iron 11 is thermally insulated from the rotor structure 12. The rotor structure 12 is operated at an ambient temperature between 250 K and 350 K. Each plate 15 has a first end 16 facing the back iron 11 and a second end 17 facing the rotor structure 12.

Figure 4:
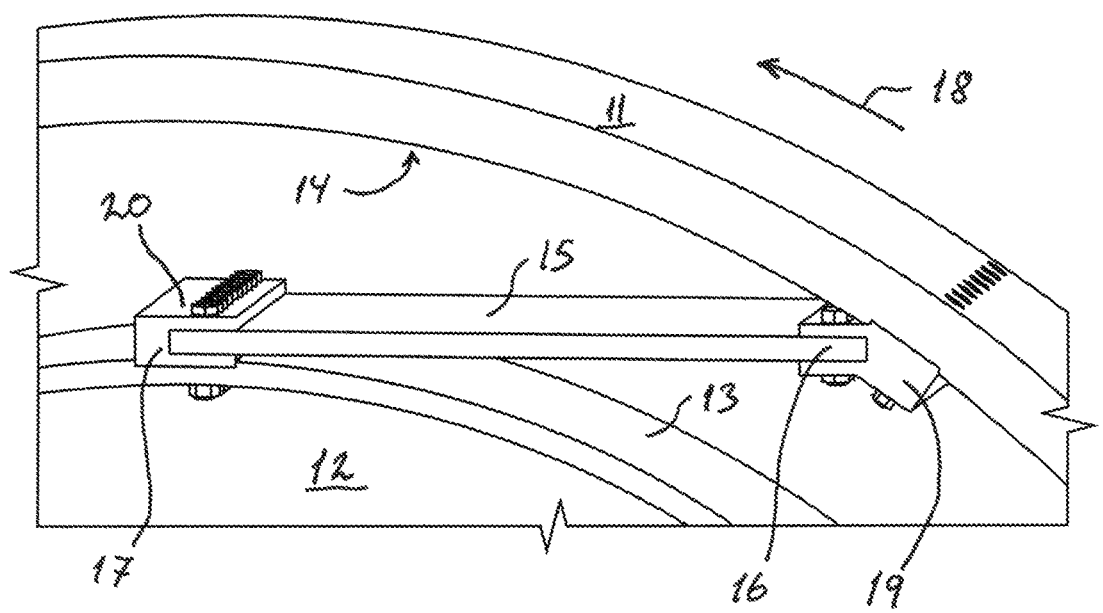
FIG. 4 shows a sectional view of the back iron and the rotor structure.

FIG. 4 shows a sectional view of the rotor structure 12 and the back iron 11. Here, the pole units 10 are omitted for illustrative purposes. The plates 15 are positioned so that the first and second ends 16, 17 extend in the axial direction as illustrated in FIGS. 2 and 3. The plates 15 are further orientated so that they extend in a combined radial and tangential direction and, thus, substantially extend in the same direction as the rotational direction 18 of the rotor 9 as indicated in FIG. 4.

A first beam 19 is arranged at the first end 16 of the plate 15 and a second beam 20 is arranged at the second end 17 of the plate 15. The first and second beams 19, 20 extend along the side surfaces 13, 14 in the axial direction as shown in FIGS. 3 and 4. The first beam 19 is firmly connected to the back iron 11 and the first end 16 of the plate 15. The first beam 20 is firmly connected to the rotor structure 12 and the second end 17 of the plate 15.

Figure 5:
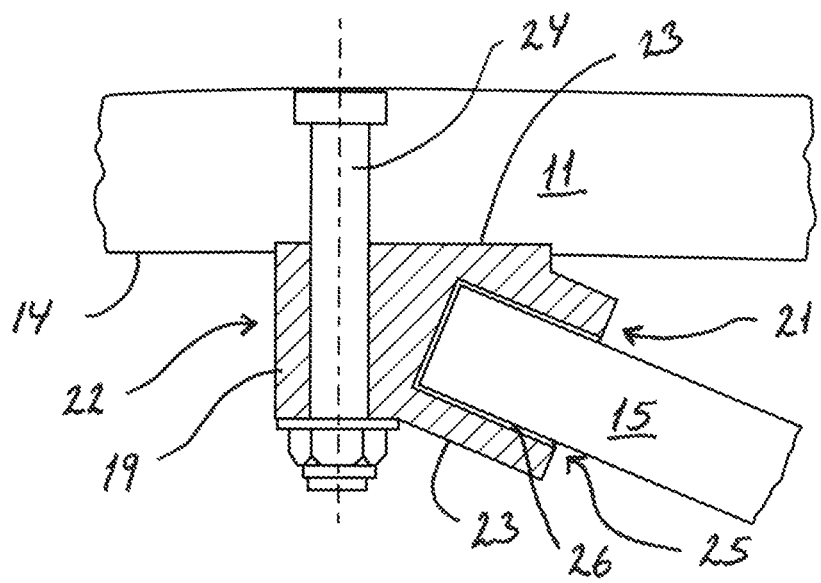
FIG. 5 shows a first embodiment of the first beam.

FIG. 5 shows a first embodiment of the first beam 19 having a first end 21 facing the plate 15 and a second end 22 facing in the opposite direction. The first beam 19 further has two opposite facing side surfaces 23 in the radial direction wherein one of which further acts as a contact surface for contacting the side surface 14, e.g. in a predetermined area thereof. Here, the first end 21 is placed in a first angled position, e.g. between 20 degrees and 80 degrees, relative to the tangential direction of the side surface 14.

The first beam 19 comprises a first set of through holes for receiving mounting means 24 in the form of bolts and nuts for firmly connecting the first beam 19 to the back iron 11. The back iron 11 comprises a corresponding set of through holes for the mounting means 24 as indicated in FIG. 4.

Figure 6:
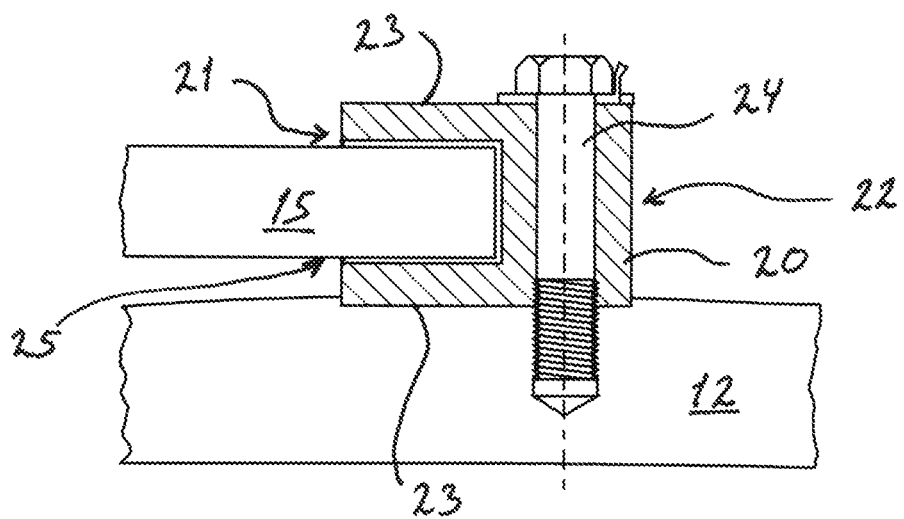
FIG. 6 shows a first embodiment of the second beam.

FIG. 6 shows a first embodiment of the second beam 20 having a first end 21' facing the plate 15 and a second end 22 facing in the opposite direction. The second beam 20 further has two opposite facing side surfaces 23 in the radial direction wherein one of which further acts as a contact surface for contacting the side surface 13, e.g. in a predetermined area thereof. Here, the first end 21' is placed in a second angled position, e.g. parallel to the tangential direction of the side surface 13.

The second beam 20 comprises a first set of through holes for receiving mounting means 24 in the form of bolts for firmly connecting the second beam 20 to the rotor structure 12. The rotor structure 12 comprises a corresponding set of through holes for the mounting means 24 as indicated in FIG. 4.

At least one groove 25 is formed in the first ends 21, 21' of the first and second beams 19, 20 for receiving the first and second ends 16, 17 of the plate 15 as shown in FIGS. 5 and 6. One or more of the inner surfaces of the respective groove 25 may act as contact surfaces for contacting one or more corresponding surfaces on the respective end 16, 17 of the plate 15. Bonding means 26 in the form of glue is applied to these contact surfaces for firmly connecting the plate 15 to the first and second beams 19, 20. Alternatively, the respective beam 19, 20 comprises a second set of through holes for receiving mounting means 24 in the form of bolts and nuts, or the first set of through holes of the respective beam 19, 20 is further used for firmly connecting the plate 15 to the respective beam 19, 20 as shown in FIG. 4.

Figure 7:
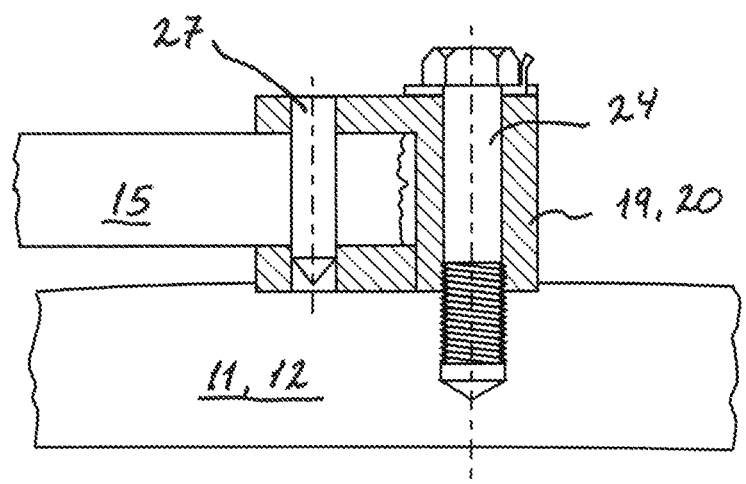
FIG. 7 shows a second embodiment of a respective beam.

FIG. 7 shows a second embodiment of a respective beam 19, 20 wherein the second set of through holes is configured for receiving other mounting means 27 in the form of pins. The pins are pushed through the web laminate of the respective end 16, 17 of the plate 15 so that the fibres in the laminate are pushed aside without breaking. This, in turn, increases the structural strength of the plate 15 around the trough holes formed by the pins.

Figure 8:
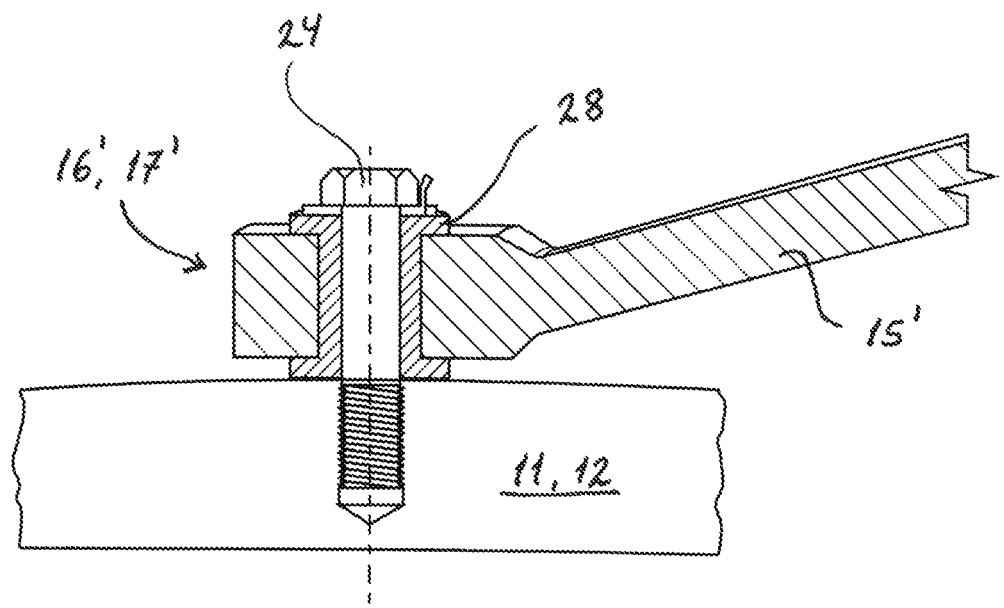
FIG. 8 shows a third embodiment of the respective beam.

FIG. 8 shows a third embodiment of a respective beam 19, 20 wherein the beam forms part of the plate 15'. In this configuration, the respective end 16', 17' that defines the beam has an increased thickness compared to the rest of the plate 15'. Bushings 28, e.g. metal bushings, are placed in the first set of through holes for added structural strength of the plate 15' around these through holes. The plate 15' is then firmly connected to the back iron 11 or rotor structure 12 via mounting means 24.

Figure 9:
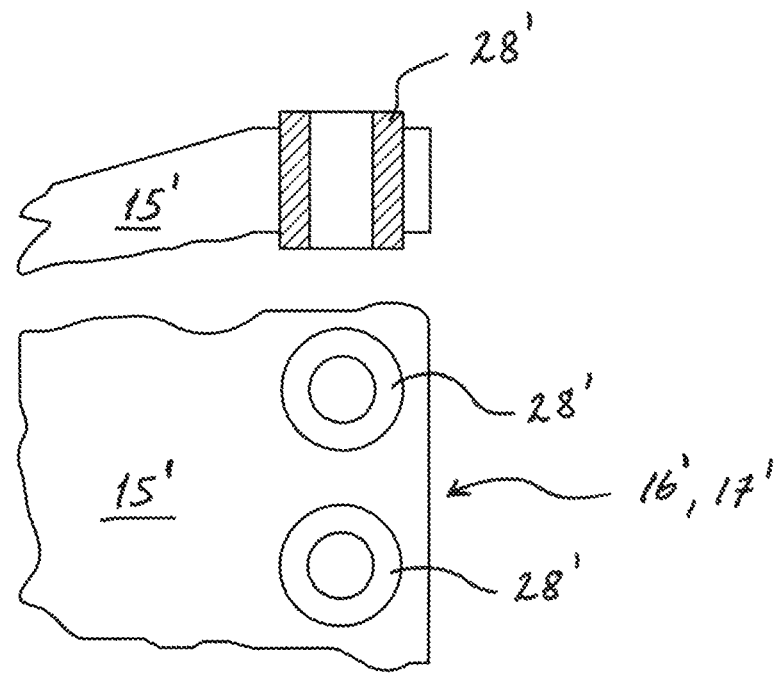
FIG. 9 shows a fourth embodiment of the respective beam.

FIG. 9 shows a fourth embodiment of a respective beam 19, 20 wherein the beam forms part of the plate 15'. This configuration differs from the embodiment of FIG. 7 by the respective end 16', 17' having the same thickness as the rest of the plate 15'. Mounting means 24 can then be inserted through these bushings 28' for firmly connecting the plate 15' to the back iron 11 or rotor structure 12.

FIG. 10 shows three embodiments of an overlapping joint between the respective beam 19, 20 and the respective end 16, 17 of the plate 15.

In FIG. 10A, the respective beam 19, 20 has a rectangular cross-sectional profile seen in the tangential direction. The respective end 16, 17 of the plate 15 and, thus, the groove 25 further have a rectangular profile.

In FIG. 10B, the respective beam 19', 20' has a wedge shaped cross-sectional profile seen in the tangential direction. The thickness measured between the side surfaces 23' tapers from the second 22' end towards the first end 21'. The respective end 16, 17 of the plate 15 and, thus, the groove 25 have a rectangular profile.

In FIG. 10C, the respective end 16", 17" of the plate 15" and, thus, the groove 25' have a wedge shaped cross-sectional profile seen in the tangential direction, and the groove 25' has a corresponding inverted wedge shaped cross-sectional profile. The thickness measured between the side surfaces of the plate 15" tapers towards the edge of the end 16", 17" as indicated in FIG. 10C.

FIG. 11 shows three other embodiments of the overlapping joint between the respective beam 19, 20 and the respective end 16, 17 of the plate 15. In these configurations, the respective beam 19, 20 and the plate 15 each comprise at least one projecting element 29 and at least one groove 30 configured to receive an opposite projecting element 29.

In FIG. 11A, the projecting elements 29 and the grooves 30 have a rectangular profile seen in the tangential direction. Likewise, the respective beam 19, 20 has a rectangular profile.

In FIG. 11B, at least one of the projecting elements 29' of the respective beam 19", 20" has a wedge shaped profile and at least one of the corresponding grooves 30' has an inverted wedge shaped profile. The thickness of this wedge shaped projecting element 29' tapers towards the edge of that element as indicated in FIG. 11B. The respective beam 19", 20" has a wedge shaped cross-sectional profile as shown in FIG. 10B.

Figure 12:
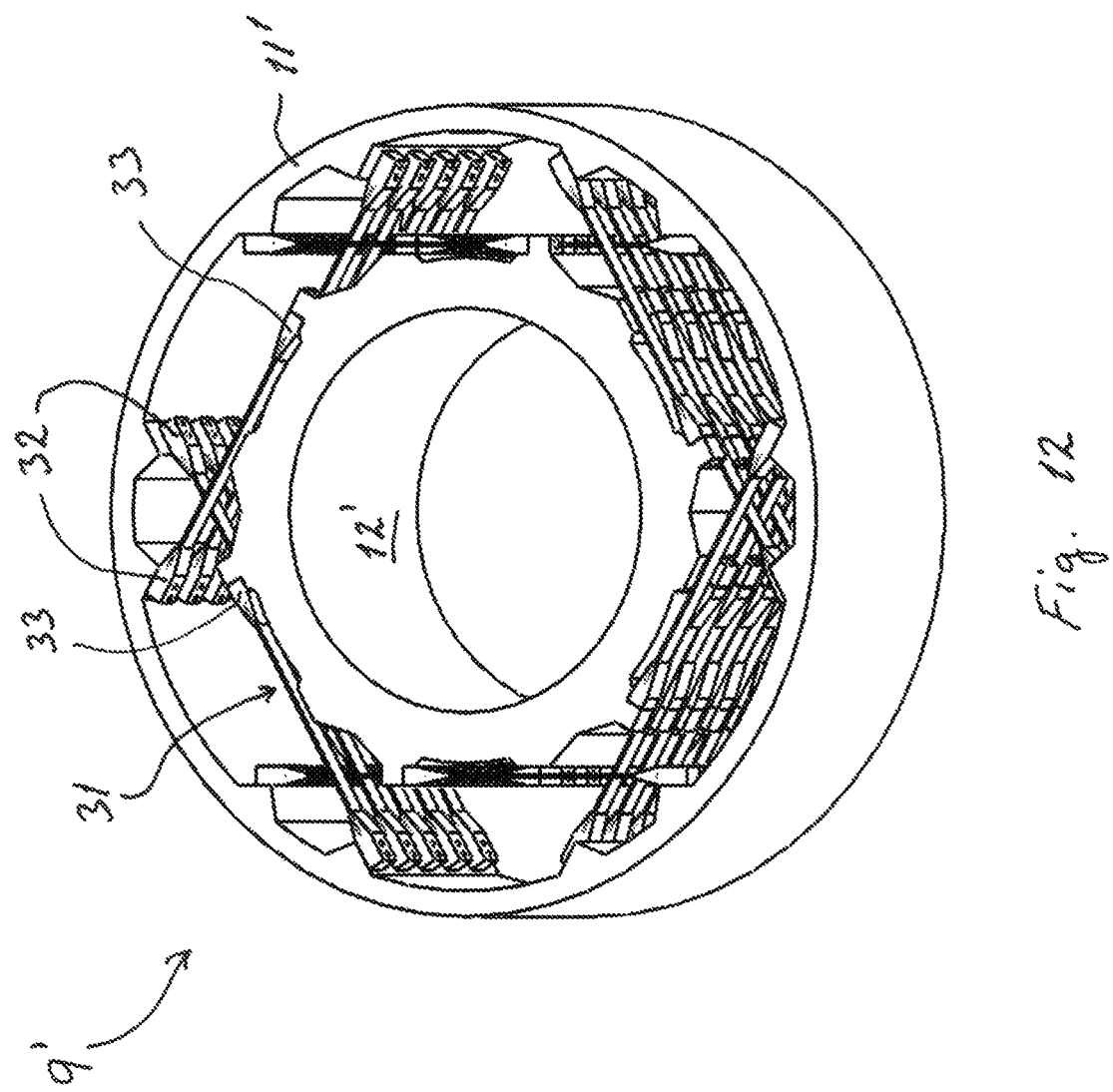
FIG. 12 shows a second embodiment of the rotor of the generator.

FIG. 12 shows a second embodiment of the rotor 9' of the generator 7 wherein a plurality of support elements 31 are arranged along the axial direction. The support elements 31 are shaped as plates 31 made of a thermally insulating material, e.g. fibre reinforced plastics (FRP). Each plate 31 is firmly connected to the back iron 11' via a first mounting element 32. Each plate 31 is further firmly connected to the rotor structure 12' via a second mounting element 33. Here, five plates 31 in the axial direction are shown. Only the yoke of the rotor structure 12' is shown here for illustrative purposes.

Figure 13:
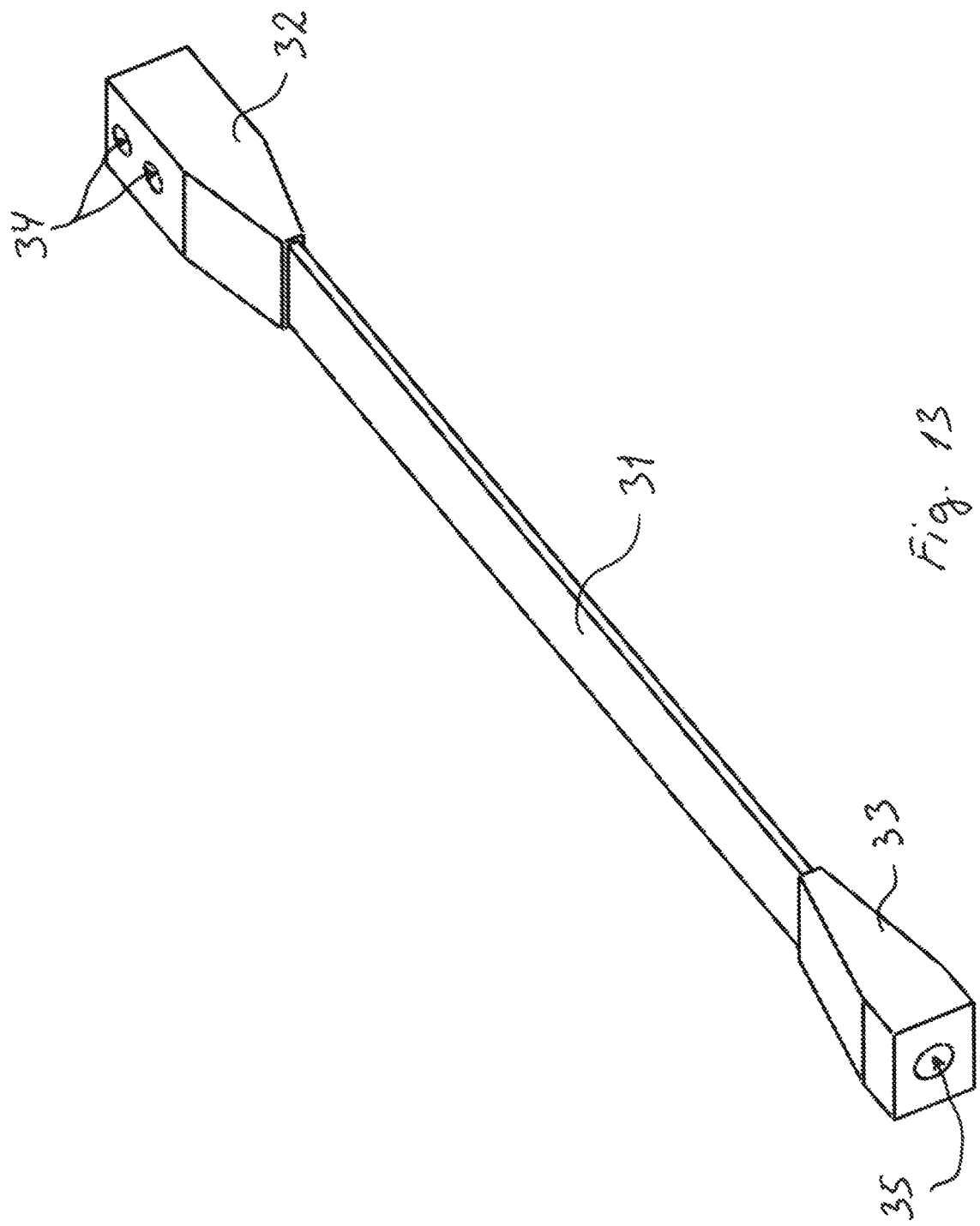
FIG. 13 shows the plate and mounting element shown in FIG. 12.

FIG. 13 shows the plate 31 and the mounting elements 32, 33 thereof. The plates 31 are made of a thermally insulating material, e.g. fibre reinforced plastics (FRP), so that the back iron 11' is thermally insulated from the rotor structure 12'.

The mounting elements 32, 33 have a first end facing the plate 31 and a second end facing in the opposite direction. The mounting elements 32, 33 further have two opposite facing side surfaces wherein one of which further acts as a contact surface for contacting the side surface of the back iron 11' or the rotor structure 12'.

The first and second mounting elements 32, 33 are configured to firmly connect the plate 31 to the back iron 11' and the rotor structure 12'. The first mounting element 32 comprises a set of through holes 34 for receiving mounting means in the form of bolts for firmly connecting the first mounting element 32 to the back iron 11'. The back iron 11' comprises a corresponding set of holes (not shown) for receiving the mounting means. The second mounting element 33 comprises a set of holes 35 for receiving mounting means in the form of bolts for firmly connecting the second mounting element 33 to the rotor structure 12'. The rotor structure 12' comprises a corresponding set of through holes (shown in FIG. 14) for receiving the mounting means.

Figure 14:
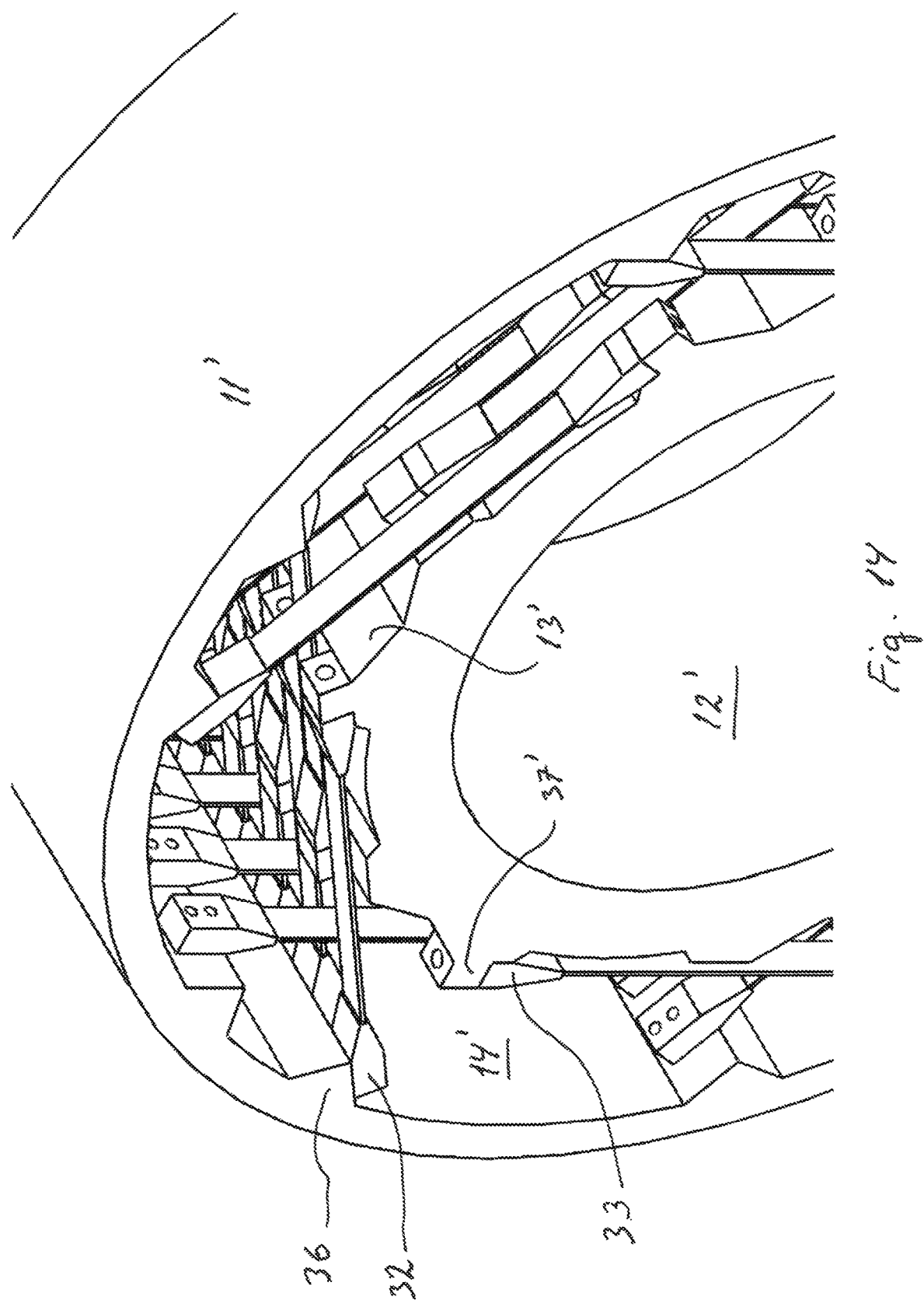
FIG. 14 shows a sectional view of the rotor shown in FIG. 12.

FIG. 14 shows a sectional view of the rotor 9' wherein the mounting elements 32, 33 are positioned relative to protrusions 36, 37 located on the side surfaces 13', 14' of the back iron 11' and the rotor structure 12'.

Each of the first mounting elements 32 of the plates 31 in the axial direction is firmly connected to the protrusion 36 on the side surfaces 14' of the back iron 11' as indicated in FIGS. 12 and 14. The mounting means of the first mounting element 32 can be accessed from a substantially radial direction as indicated in FIGS. 12 and 14.

Each of the second mounting elements 33 of the plates 31 in the axial direction is firmly connected to the protrusion 37 on the side surfaces 13' of the rotor structure 11' as indicated in FIGS. 12 and 14. The mounting means of the second mounting element 32 can be accessed from a substantially tangential direction as indicated in FIGS. 12 and 14.

Figure 15:
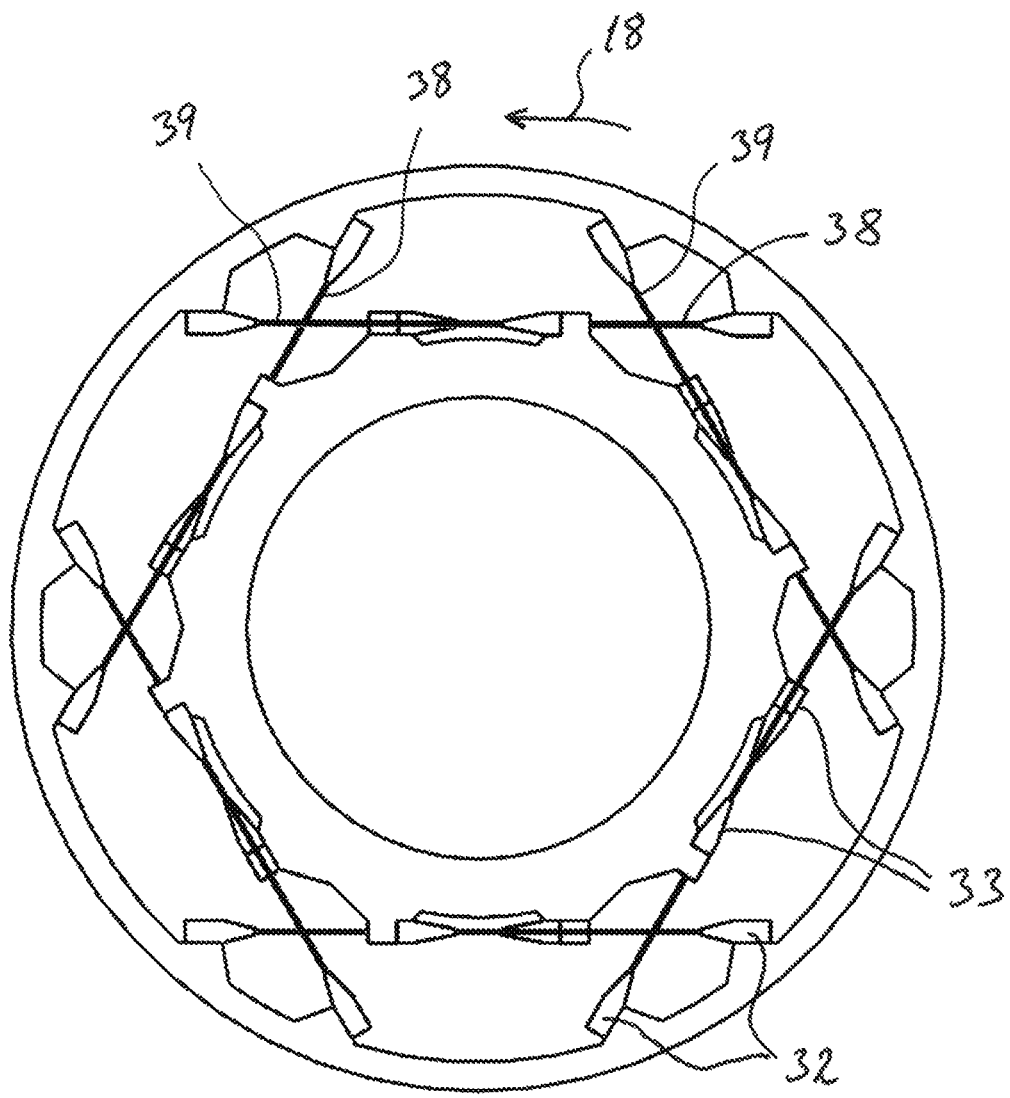
FIG. 15 shows the rotor shown in FIG. 12 seen in the axial direction.

FIG. 15 shows the rotor 9' seen in the axial direction wherein a first plate 38 is positioned so that it substantially extends in the same direction as the rotational direction 18 of the rotor 9'. A second plate 39 is positioned so that it substantially extends in the opposite direction of the rotational direction 18 of the rotor 9'. The first and second plates 38, 39 are offset relative to each other in the axial direction as shown in FIG. 14. The second mounting elements 33 of the first and second plates 38, 39 are further offset relative to each other in the radial direction as shown in FIGS. 14 and 15.

The adjacent first and second plates 38, 39, seen in the axial direction, form one set located on the circumference of the rotor structure 12'. Here, six sets of first and second plates 38, 39 are shown along the circumference of the rotor structure 12. The first plate 38 of this one set is positioned during assembly so that it intersects a second plate 39 of an adjacent set as shown in FIG. 15. Likewise, the second plate 39 of this one set is positioned during assembly so that it intersects a first plate 38 of another adjacent set as shown in FIG. 15.

Figure 16:
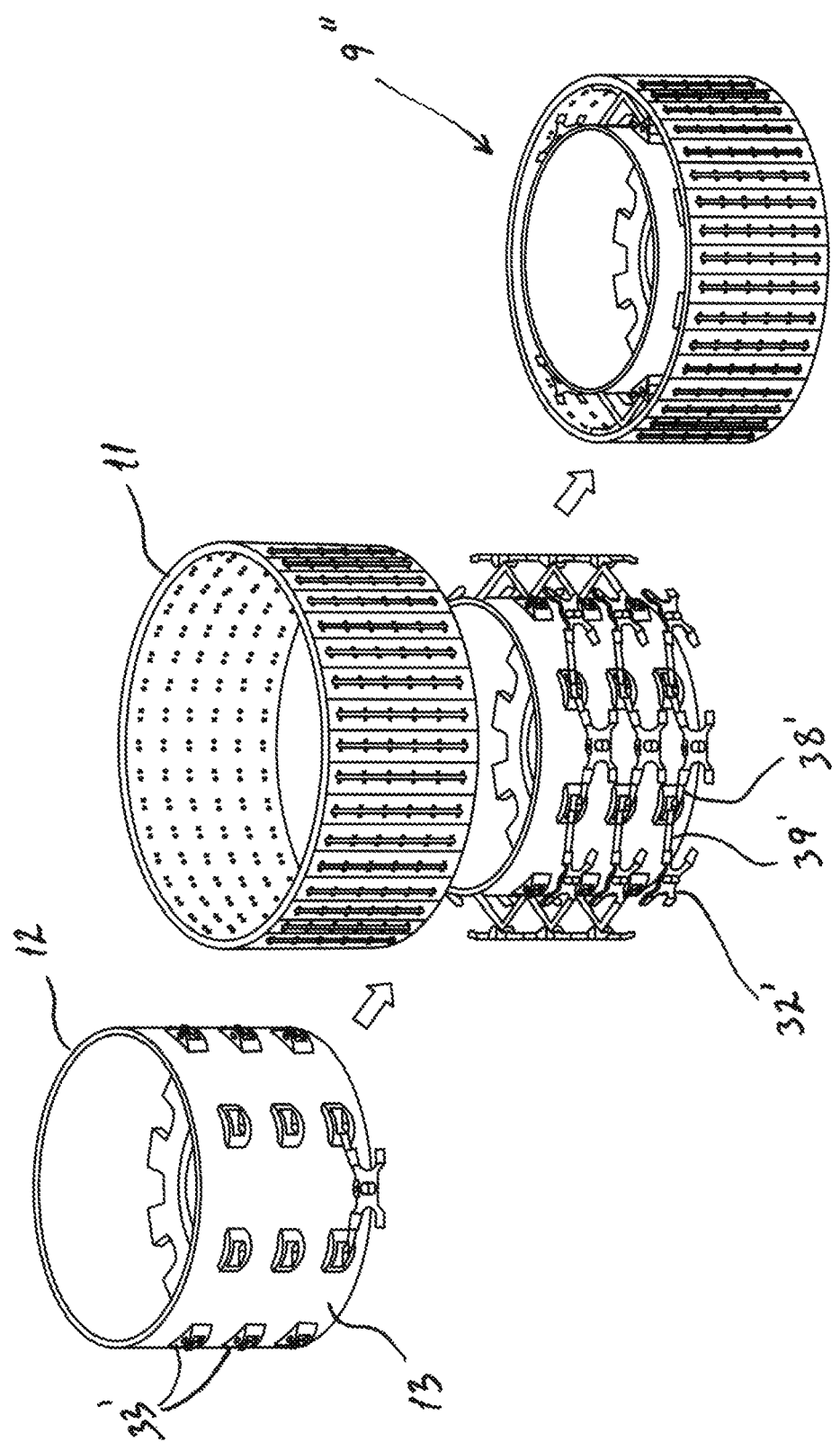
FIG. 16 shows a first embodiment of assembling the rotor of the generator.

FIG. 16 shows a first embodiment of a method of assembling the rotor 9" according to the invention. Initially, a rotor structure 12 is provided. A number of second mounting elements 33' are arranged on the side surface 13 and firmly connected to the rotor structure 12. A number of first and second plates 38', 39' are then positioned relative to the second mounting elements 33' and firmly connected via first pin connections (shown in FIG. 18). A number of first mounting elements 32' are positioned relative to the first and second plates 38', 39' and firmly connected via second pin connections (shown in FIG. 18). The back iron 11 is aligned relative to the rotor structure 12 and moved into position. The first mounting elements 32' are then firmly connected to the back iron 11.

The rotor coils are arranged on the back iron 11 before or after moving the back iron 11 into position.

Figure 17:
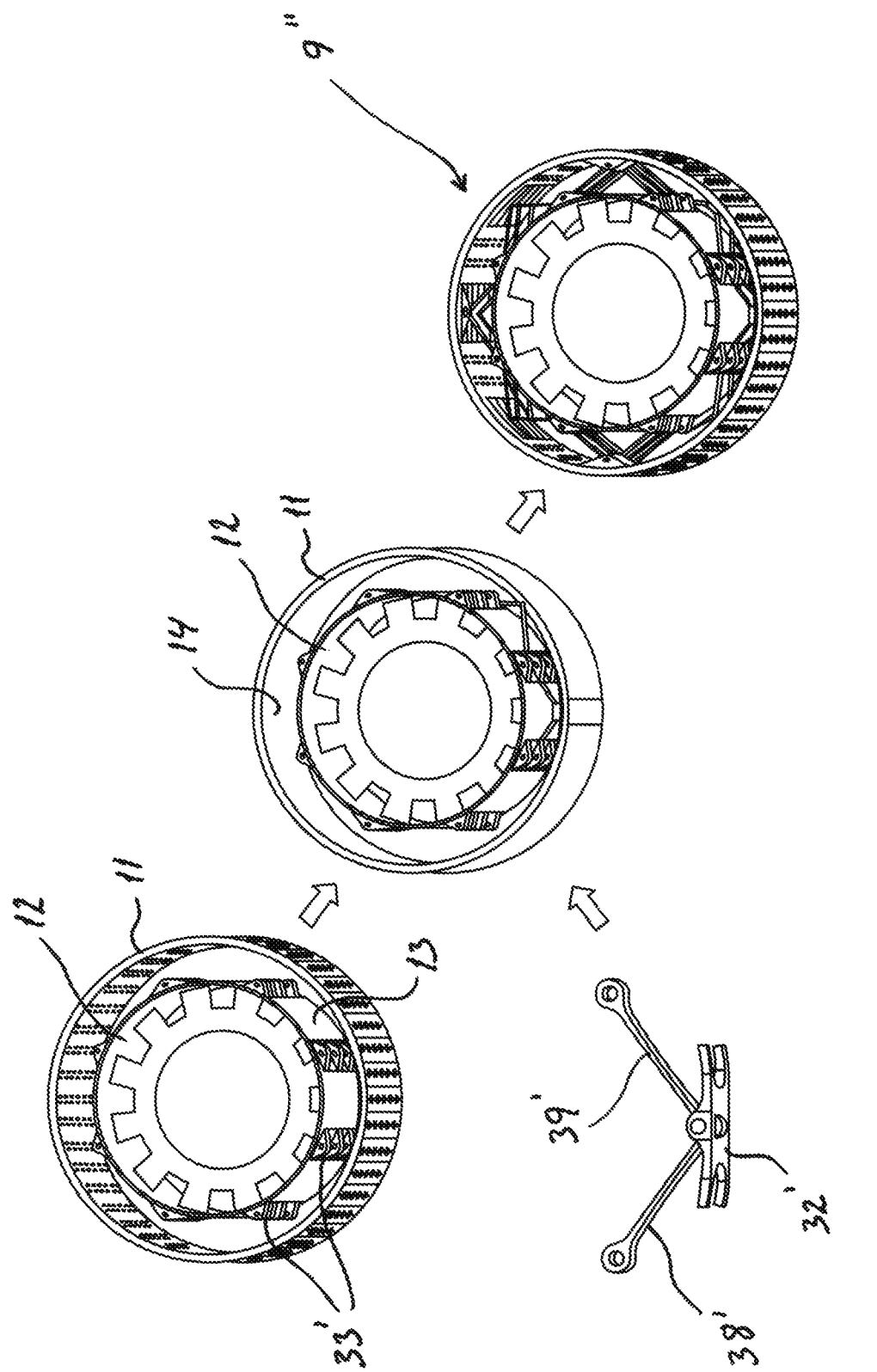
FIG. 17 shows a second embodiment of assembling the rotor of the generator.

FIG. 17 shows a second embodiment of the method of assembling the rotor 9'''. In this embodiment, the second mounting elements 33' are arranged on the side surface 13 and firmly connected to the rotor structure 12. The back iron 11 is then moved into position relative to the rotor structure 12. The first and second plates 38', 39' are firmly connected to the respective first mounting elements 32' separated from the rotor 9' as shown in FIG. 17. The first and second plates 38', 39' with the first mounting elements 32' are then arranged on the side surface 14 and firmly connected to the back iron 11 and the second mounting elements 33' respectively. Here only one predetermined area of the back iron 11 is shown for receiving the first and second plates 38', 39' with the first mounting elements 32'.

Figure 18:
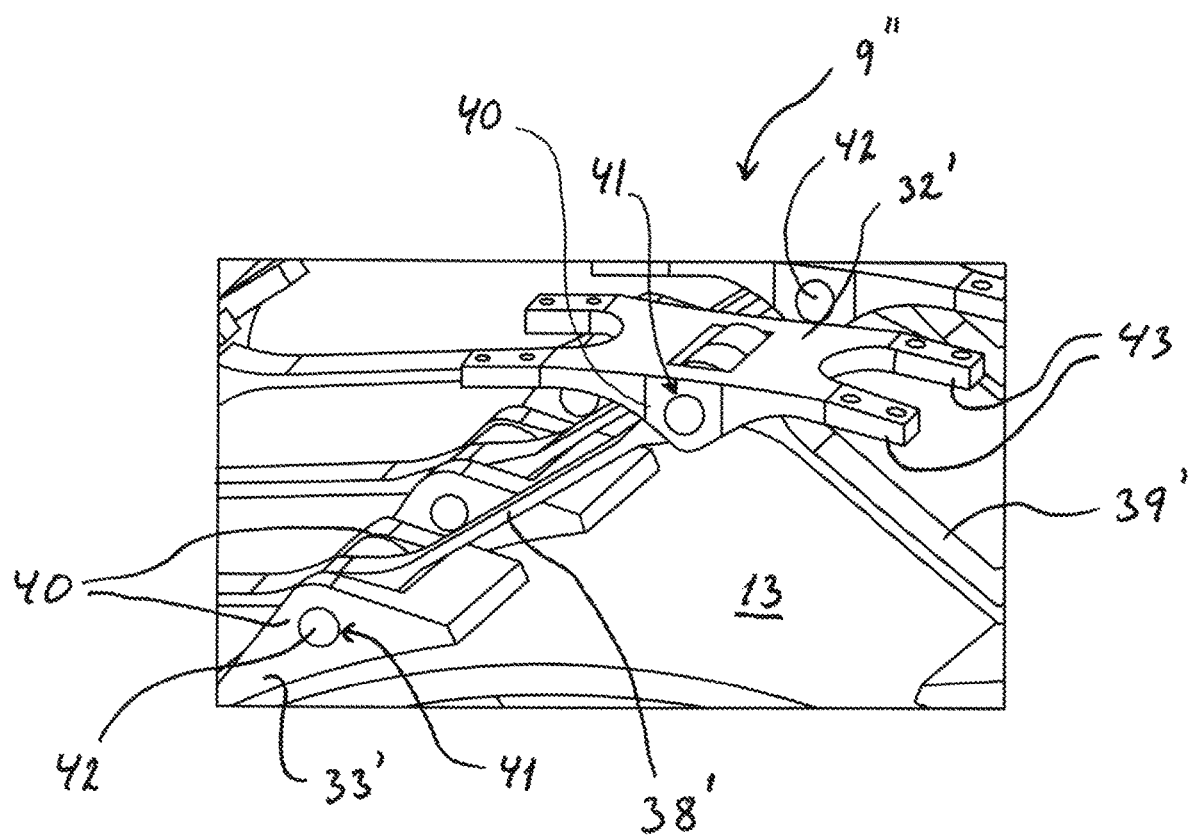
FIG. 18 shows a third embodiment of the plates and the mounting elements of the rotor shown in FIGS. 16-17.

FIG. 18 shows a third embodiment of the rotor 9''' wherein the first and second mounting elements 32', 33' differ from the first and second mounting elements 32, 33. Here, only a sectional view of the rotor 9''' is shown. In this embodiment, the mounting elements 32', 33' have at least two projecting elements 40 extending radially outwards from a bottom part.

The bottom part is configured for mounting and/or bonding to the back iron 11 or rotor structure 12. The projecting elements 40 each has a through hole 41 extending in the axial direction for receiving and holding a removable pin 42.

Another through hole 41 is arranged in the first and second ends of the respective plate 38', 39'. This through hole 41 also extends in the axial direction and is configured for receiving and holding the pin 42. The pin 42 is connected to both the first and second plates 38' as shown in FIGS. 16 and 17.

One or both of the mounting element 32', 33' optionally have a number of fingers 43 extending in the tangential direction as shown in FIG. 18. Here, the fingers 43 are only shown on the first mounting elements 32'. The fingers 43 are configured to be mounted and/or bonded to the back iron 11 or rotor structure 12 for optimal transfer of loads.

Figure 19:
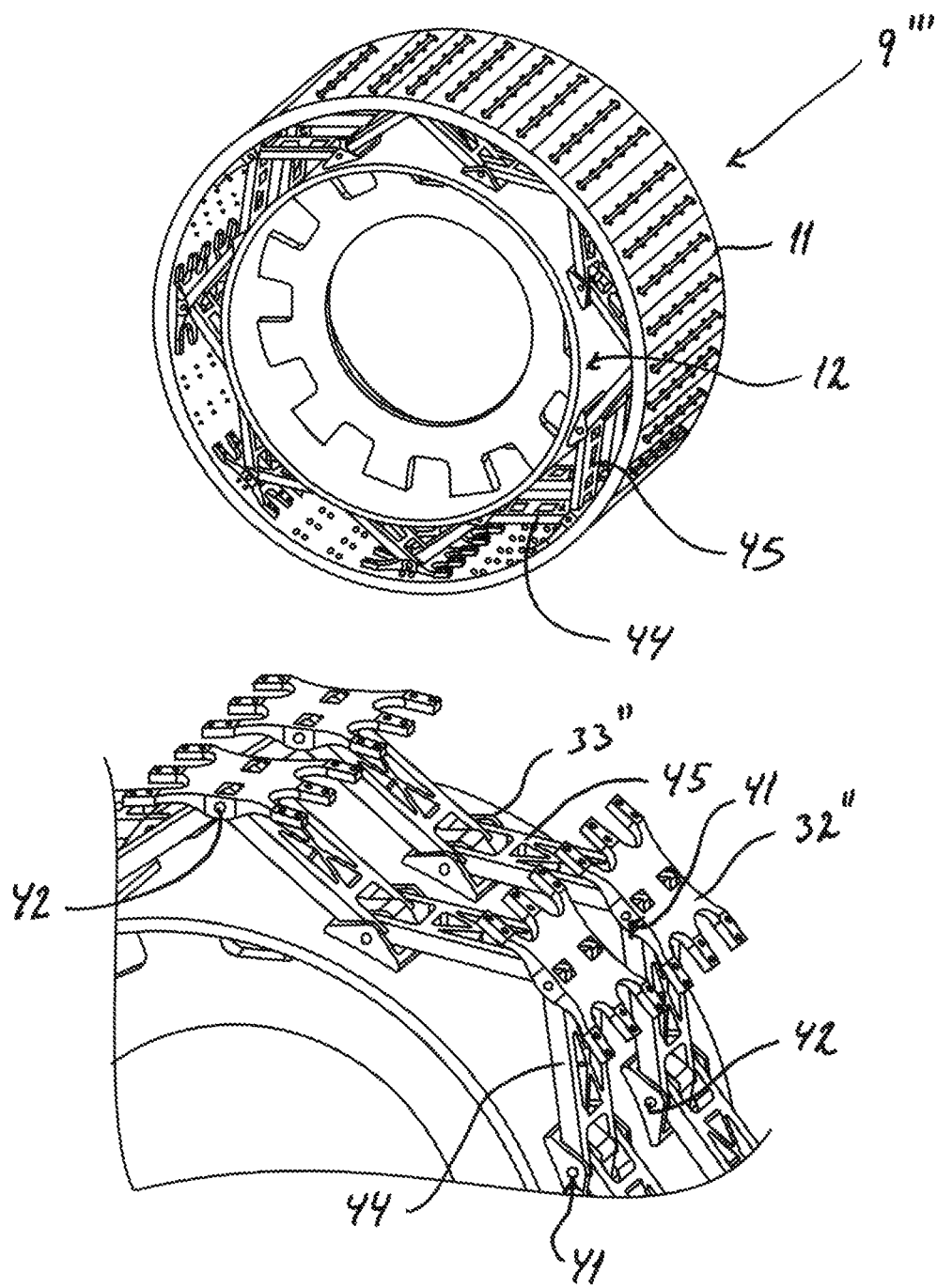
FIG. 19 shows a fourth embodiment of the rotor of the generator.

FIG. 19 shows a fourth embodiment of the rotor 9''' wherein the support element differs from the plate 15 and the plate 31. In this embodiment, the support elements are shaped as beams made of a thermally insulating material, e.g. fibre reinforced plastics (FRP). Each of the beams has a constant thickness along its length.

A first support element or beam 44 and a second support element or beam 45 comprise a number of plate members or knuckles, e.g. one, two, or more, distributed along the width of the respective first and second ends as indicated in FIG. 19. Each plate member or knuckle has a trough hole 41 for receiving and holding the pin 42. The first and second mounting element 32'', 33'' may further comprise at least one additional projecting element, e.g. a plate member or knuckle, for added support. The pin 42 further extends through this additional projecting element.

The invention claimed is:

1. A wind turbine comprising:
a wind turbine tower,
a nacelle arranged on top of the wind turbine tower,
a rotatable hub arranged relative to the nacelle, which hub is connected to at least two wind turbine blades,
a generator rotatably connected to the hub, wherein the generator comprises a rotor arranged rotatably relative to a stator, the rotor comprises a back iron and a rotor structure, the rotor further comprises at least one pole unit arranged relative to the back iron, the at least one pole unit comprises at least one rotor coil made of a superconductive material, the stator comprises at least one pole unit with at least one stator coil, wherein the at least one rotor coil is configured to interact with the at least one stator coil via an electromagnetic field when the rotor is rotated relative to the stator, wherein the rotor further comprises at least one support element arranged between the back iron and the rotor structure, the at least one support element comprises a first end connected to the back iron and a second end connected to the rotor structure, wherein the at least one support element is made of a thermally insulating material, wherein the back iron comprises a side surface facing the rotor structure and the rotor structure comprises a corresponding side surface facing the back iron, wherein the first end is connected to the side surface and the second end is connected to the corresponding side surface, wherein the first and second ends extend in an axial direction defined by the rotor, wherein a plurality of support elements are arranged relative to each other along an axial direction defined by the rotor, wherein at least one mounting element is arranged at at least one of the first and second ends of each of the plurality of support elements, wherein the at least one mounting element is firmly connected to at least one of the back iron and the rotor structure such that the support elements are firmly connected to the back iron or to the rotor structure via the at least one mounting means, wherein the mounting means comprising bolts, nuts and/or screws.

2. A wind turbine according to claim 1, wherein the at least one support element is orientated relative to the rotational direction of the rotor, wherein the at least one support element from the first end towards the second end substantially extends in the same direction as a rotational direction of the rotor.

3. A wind turbine according to claim 1, wherein at least one beam shaped element is arranged at at least one of the first and second ends, wherein the at least one beam shaped element extends in the axial direction.

4. A wind turbine according to claim 3, wherein the at least one of the first and second ends and the at least one beam shaped element are firmly connected by mounting means or bonding means.

5. A wind turbine according to claim 4, wherein the at least one of the first and second ends and the at least one beam shaped element are firmly connected by a combination of mounting means and bonding means.

6. A wind turbine according to claim 3, wherein the at least one beam shaped element forms part of the at least one of the first and second ends.

7. A wind turbine according to claim 3, wherein the at least one beam shaped element comprises at least one relief element configured to reduce stresses in the at least one beam shaped element.

8. A wind turbine according to claim 1, wherein one of the at least one of the first and second ends and the at least one beam shaped element has a wedge shaped end facing the other of the at least one of the first and second ends and the at least one beam shaped element, wherein said other of the at least one of the first and second ends and the at least one beam shaped element has a corresponding end shaped to receive said wedge shaped end.

9. A wind turbine according to claim 1, wherein the at least one support element comprises at least one reinforcing element which extends between the first end and the second end.

10. A wind turbine according to claim 1, wherein the at least one support element is made of a fiber reinforced material, particularly fibre reinforced plastics.

11. A wind turbine according to claim 1, wherein the at least one support element is made of a first layer sandwiched between at least two second layers, wherein one of the first layer and the at least second layer has a greater structural strength than the other layer.

12. A wind turbine according to claim 1, wherein the plurality of support elements comprise at least one first support element and at least one second support element, wherein the at least one first support element from its first end towards its second end substantially extends in one direction relative to a rotational direction of the rotor, and the at least one second support element from its first end towards its second end substantially extends in an opposite direction.

13. A wind turbine according to claim 1, wherein the plurality of support elements comprise at least a first set of support elements and at least a second set of support elements, wherein at least one of the support elements of the first set intersects at least one of the support elements of the at least second set.

14. A wind turbine according to claim 1, wherein the plurality of support elements comprise a first set of support elements and at least a second set of support elements, wherein the at least one mounting element of the first set and the at least one mounting element of the at least second set are aligned along a common axial line.

15. A wind turbine according to claim 1, wherein the at least one mounting element is firmly connected to at least one of the back iron and the rotor structure by mounting means or bonding means or a combination thereof.

16. A wind turbine according to claim 1, wherein the at least one mounting element is firmly connected to the at least one support element by at least one pin connection.

17. A wind turbine according to claim 16, wherein the at least one support element has a thickness between 80 millimetres and 120 millimetres.

18. A method of assembling a generator of a wind turbine according to claim 1, wherein the method comprises the steps of:
- providing a rotor of a generator, wherein the rotor at least comprises a rotor structure,
- arranging a back iron of the rotor relative to the rotor structure,
- positioning at least one support element relative to the rotor structure and the back iron,
- mounting a first end of said at least one support element to the back iron, and further mounting a second end of said at least one support element to the rotor structure,
- wherein the step of positioning the at least one support element comprises arranging a plurality of support elements along an axial direction defined by the rotor,
- wherein the at least one mounting element is firmly connected to said at least one of the first and second ends such that the support elements are firmly connected to the back iron or to the rotor structure via the at least one mounting means, wherein the mounting means comprising bolts, nuts and/or screws.

19. A method according to claim 18, wherein the at least one support element is arranged between a side surface of the back iron and a corresponding side surface of the rotor structure, wherein the at least one support element is angled relative to a tangential direction of at least one of the side surface and the corresponding side surface.

20. A method according to claim 18, wherein the first or second end is mounted to the back iron or to the rotor structure before arranging the back iron relative to the rotor structure.

21. A method according to claim 18, wherein the method further comprises the step of:
- arranging at least one beam shaped element on at least one of the side surface and the corresponding side surface, and positioning at least one of the first and second ends relative to said at least one beam shaped element.

22. A method according to claim 21, wherein the at least one beam shaped element and the at least one of the first and second ends is firmly connected by using mounting means or bonding means or a combination thereof.

23. A method according to claim 18, wherein the method further comprises the step of:
- arranging at least one mounting element at at least one of the first and second ends of each of the plurality of support elements.

24. A method according to claim 18, wherein the method further comprises steps of:
- positioning at least one first support element relative to a rotational direction of the rotor so that it substantially extends in one direction, and
- positioning at least one second support element relative to the at least one first support element so that it substantially extends in an opposite direction.

25. A method according to claim 18, wherein at least one of said plurality of support elements intersects at least one other support element.

26. A method according to claim 18, wherein at least one of the at least one support element, the at least one beam shaped element and the at least one mounting element are manufactured by pultrusion or extrusion.

* * * * *